(12) United States Patent
Mahdi et al.

(10) Patent No.: US 11,095,895 B2
(45) Date of Patent: Aug. 17, 2021

(54) HUMAN VISUAL SYSTEM OPTIMIZED TRANSFORM COEFFICIENT SHAPING FOR VIDEO ENCODING

(71) Applicant: INTEL CORPORATION, Santa Clara, CA (US)

(72) Inventors: Nader Mahdi, Maple Ridge (CA); Chekib Nouira, Vancouver (CA); Hassen Guermazi, Vancouver (CA); Amir Naghdinezhad, Vancouver (CA); Faouzi Kossentini, Vancouver (CA); Foued Ben Amara, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 15/886,520

(22) Filed: Feb. 1, 2018

(65) Prior Publication Data

US 2019/0045188 A1    Feb. 7, 2019

(51) Int. Cl.

| | | |
|---|---|---|
| *H04N 19/124* | (2014.01) | |
| *H04N 19/136* | (2014.01) | |
| *H04N 19/126* | (2014.01) | |
| *H04N 19/18* | (2014.01) | |
| *H04N 19/122* | (2014.01) | |
| *H04N 19/176* | (2014.01) | |
| *H04N 19/14* | (2014.01) | |
| *H04N 19/625* | (2014.01) | |
| *H04N 19/91* | (2014.01) | |
| *H04N 19/96* | (2014.01) | |

(52) U.S. Cl.
CPC ........ *H04N 19/126* (2014.11); *H04N 19/122* (2014.11); *H04N 19/14* (2014.11); *H04N 19/176* (2014.11); *H04N 19/18* (2014.11); *H04N 19/625* (2014.11); *H04N 19/91* (2014.11); *H04N 19/96* (2014.11)

(58) Field of Classification Search
CPC .... H04N 19/126; H04N 19/122; H04N 19/14; H04N 19/176; H04N 19/18; H04N 19/625; H04N 19/91; H04N 19/96; H04N 19/124; H04N 19/136; G06F 17/14
See application file for complete search history.

(56) References Cited

U.S. PATENT DOCUMENTS

| | | | |
|---|---|---|---|
| 2001/0017941 A1* | 8/2001 | Chaddha | ................. G06T 9/008 |
| | | | 382/236 |
| 2003/0190085 A1* | 10/2003 | Lin | ...................... G06F 17/147 |
| | | | 382/250 |

(Continued)

*Primary Examiner* — Patrick E Demosky
(74) *Attorney, Agent, or Firm* — Green, Howard & Mughal LLP.

(57) ABSTRACT

Techniques related to transform coefficient shaping for video encoding are discussed. Such techniques include applying weighting parameters from one or more perceptually-designed matrices of weighting parameters to blocks of transform coefficients to generate weighted transform coefficients and encoding the weighted transform coefficients into a bitstream. The process may be based on sets of perceptually designed matrices of weighting parameters. Classifier outputs may be used to select from the set of perceptually designed matrices a subset of matrices to work with. The latter may be used in a synthesis procedure to develop the final weighting matrix to be used is shaping the transform coefficients.

21 Claims, 14 Drawing Sheets

(56) References Cited

U.S. PATENT DOCUMENTS

| | | | |
|---|---|---|---|
| 2011/0109753 A1* | 5/2011 | Srinivasamurthy | H04N 19/61 348/208.4 |
| 2012/0082243 A1* | 4/2012 | Bayion | H04N 19/619 375/240.26 |
| 2016/0088302 A1* | 3/2016 | Zheng | H04N 19/46 375/240.03 |
| 2016/0150230 A1* | 5/2016 | He | H04N 19/105 375/240.03 |
| 2016/0366422 A1* | 12/2016 | Yin | H04N 19/117 |

* cited by examiner

HUMAN VISUAL SYSTEM OPTIMIZED TRANSFORM COEFFICIENT SHAPING FOR VIDEO ENCODING

BACKGROUND

In compression/decompression (codec) systems, compression efficiency, data utilization efficiency, and video quality are important performance criteria. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable. Furthermore, encoding speed and efficiency are important aspects of video encoding. Traditionally, quantization is used to reduce the bit rate associated with coding the transform coefficients. However, quantization may lead to the appearance of various video quality artifacts, particularly at low bit rates. Such artifacts adversely affect visual quality, which is an important aspect of the user experience in many video applications.

It may be advantageous to improve bit rate reduction while maintaining or even improving video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
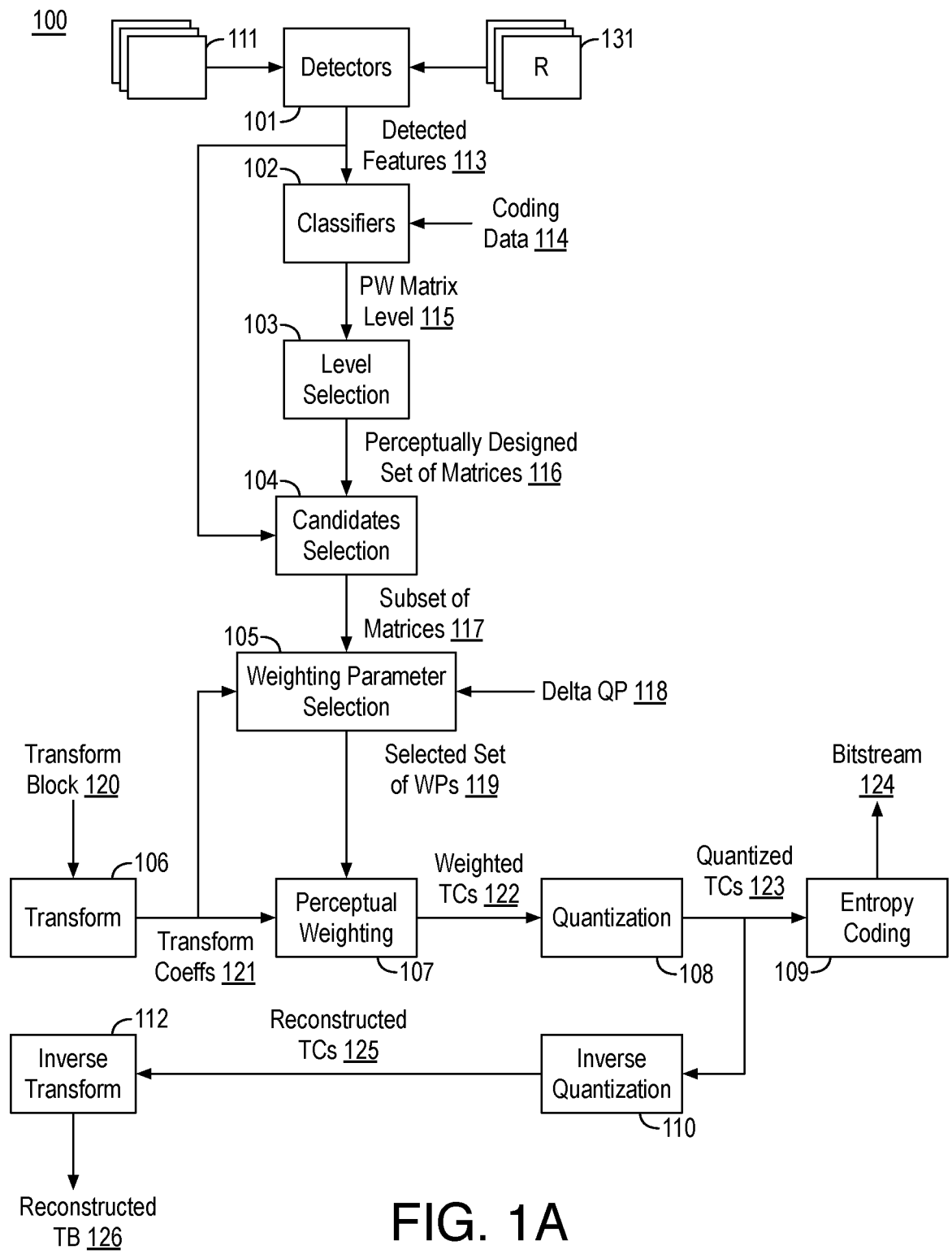
FIG. 1A is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to human visual system optimized transform coefficient shaping.

Techniques discussed herein provide for improved data coding efficiency particularly in reducing bit rate by applying weighting parameters to blocks of transform coefficients. Such weighting parameters may be perceptually designed and refined such that the weighting parameters are human visual system optimized to maintain the same visual quality in decoded video while reducing bit rate in the video encode. The techniques discussed herein minimize the number of coding bits associated with the coding of transform coefficients. Significant bit rate reduction may be attained while video quality is maintained or nearly maintained by applying perceptually derived weights to transform coefficients before or after quantization. As used herein, the term block of transform coefficients refers to transform coefficients before quantization or after quantization. As discussed further herein, various classifier outputs may be used to determine several candidate coefficient weighting matrices (from multiple perceptually-designed matrices of weighting parameters) and a refinement process may be implemented to synthesize a final weighting matrix using the selected weighting matrices. The synthesis process may use rate distortion measurements on a transform block level (and transform coefficient matrix level) or on a localized level within the transform block (and within the transform coefficient matrix) to develop the final set of weights as discussed further herein. Such techniques are not normative such that they do not depend on any particular video coding standard and may be used any time residual transform is used in the encode process.

FIG. 1A is an illustrative diagram of an example system 100 for providing video coding, arranged in accordance with at least some implementations of the present disclosure. As shown in FIG. 1A, system 100 includes a detector module 101, a classifier module 102, a level selection module 103, a candidates selection module 104, a weighting parameter selection module 105, a transform module 106, a perceptual weighting module 107, a quantization module 108, an entropy encoder 109, an inverse quantization module 110, and an inverse transform module 112.

As shown, system 100 receives input video 111, reconstructed video 131, transform blocks 120, coding data 114, and delta QP data 118 and system 100 provides reconstructed transform blocks 126, and an encoded bitstream 124. As will be understood by those of skill in the art, system 100 may form a part of an encode system, pipeline, or the like. For example, reconstructed video 131 may be received from a local decode loop (of which inverse quantization module 110 and inverse transform module 112 may form a part), coding data 114 and delta QP data 118 may be received from an encode controller, and transform block 120 may be received from a differencer after intra or inter prediction. Furthermore, reconstructed transform blocks 126 may be provided to a remainder of a local decode loop and bitstream 124 may be provided for packetization or the like and eventual storage or transmission to a remote device. Such components and their operations are known by those of skill in the art and will not be discussed further herein for the sake of clarity of presentation.

System 100 receives input video 111 for coding and provides video compression to generate bitstream 124 such that system 100 may be a part of a video encoder implemented via a computer or computing device or the like. Bitstream 124 may be any suitable bitstream such as a standards compliant bitstream. For example, bitstream 124 may be H.264/MPEG-4 Advanced Video Coding (AVC) standards compliant, H.265 High Efficiency Video Coding (HEVC) standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to pictures and blocks and/or coding units for the sake of clarity of presentation. However, such pictures may be characterized as frames, video frames, sequences of frames, video sequences, or the like, and such blocks and/or coding units may be characterized as coding blocks, macroblocks, sub-units, sub-blocks, regions, sub-regions, etc. Typically, the terms block and unit are used interchangeably herein. For example, a picture or frame of color video data may include a luma plane or component (i.e., luma pixel values) and two chroma planes or components (i.e., chroma pixel values) at the same or different resolutions with respect to the luma plane. Input video 111 may include pictures or frames that may be divided into blocks and/or coding units of any size, which contain data corresponding to, for example, M×N blocks and/or coding units of pixels. Such blocks and/or coding units may include data from one or more planes or color channels of pixel data. As used herein, the term block may include macroblocks, coding units, or the like of any suitable sizes. As will be appreciated such blocks may also be divided into sub-blocks for prediction, transform, etc.

Figure 2:
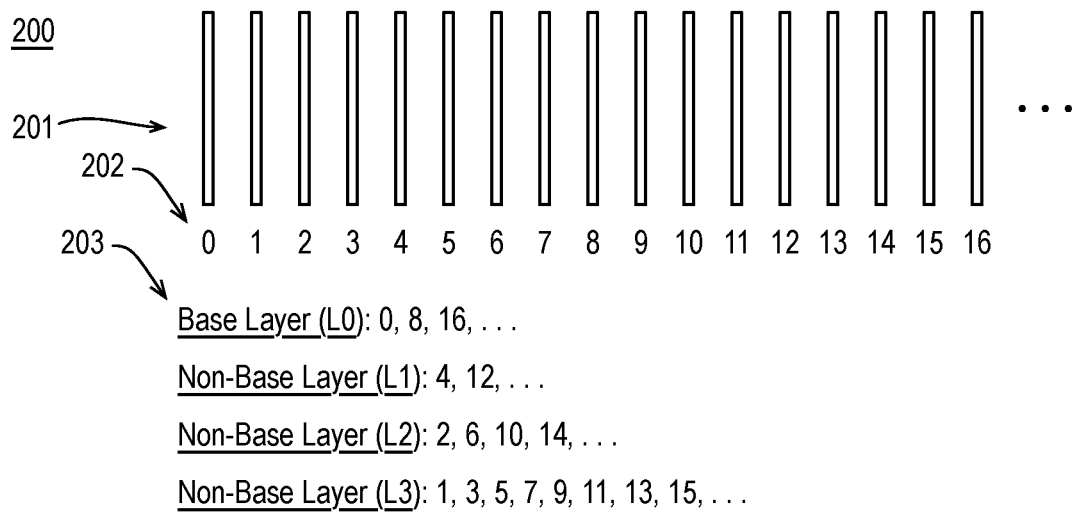
FIG. 2 illustrates an example group of pictures.

FIG. 2 illustrates an example group of pictures 200, arranged in accordance with at least some implementations of the present disclosure. As shown in FIG. 2, group of pictures 200 may include any number of pictures 201 such as 64 pictures (with 0-16 being illustrated) or the like. Furthermore, pictures 201 may be provided in a temporal order 202 such that pictures 201 are presented in temporal order while pictures 201 are coded in a coding order (not shown) such that the coding order is different with respect to temporal order 202. Furthermore, pictures 201 may be provided in a picture hierarchy 203 such that a base layer (L0) of pictures 201 includes pictures 0, 8, 16, and so on; a non-base layer (L1) of pictures 201 includes pictures 4, 12, and so on; a non-base layer (L2) of pictures 201 includes pictures 2, 6, 10, 14, and so on; and a non-base layer (L3) of pictures 201 includes pictures 1, 3, 5, 7, 9, 11, 13, 15, and so on. For example, moving through the hierarchy, for inter modes, pictures of L0 may only reference other pictures of L0, pictures of L1 may only reference pictures of L0, pictures of L2 may only reference pictures of L0 or L1, and pictures of L3 may reference pictures of any of L0-L2. For example, pictures 201 include base layer pictures and non-base layer pictures such that base layer pictures are reference pictures for non-base layer pictures but non-base layer pictures are not reference pictures for base layer pictures as shown. In an embodiment, input video 111 includes group of pictures 200 and/or system 100 implements group of pictures 200 with respect to input video 111. Although illustrated with respect to an example, group of pictures 200, input video 111 may have any suitable structure implementing group of pictures 200, another group of pictures format, etc. In an embodiment, a prediction structure for coding video includes groups of pictures such as group of pictures 200. For example, in the context of broadcast and streaming implementations, the prediction structure may be periodic and may include periodic groups of pictures (GOPs). In an embodiment, a GOP includes about 1-second of pictures organized in the structure described in FIG. 2, followed by another GOP that starts with an I picture, and so on.

Figure 3:
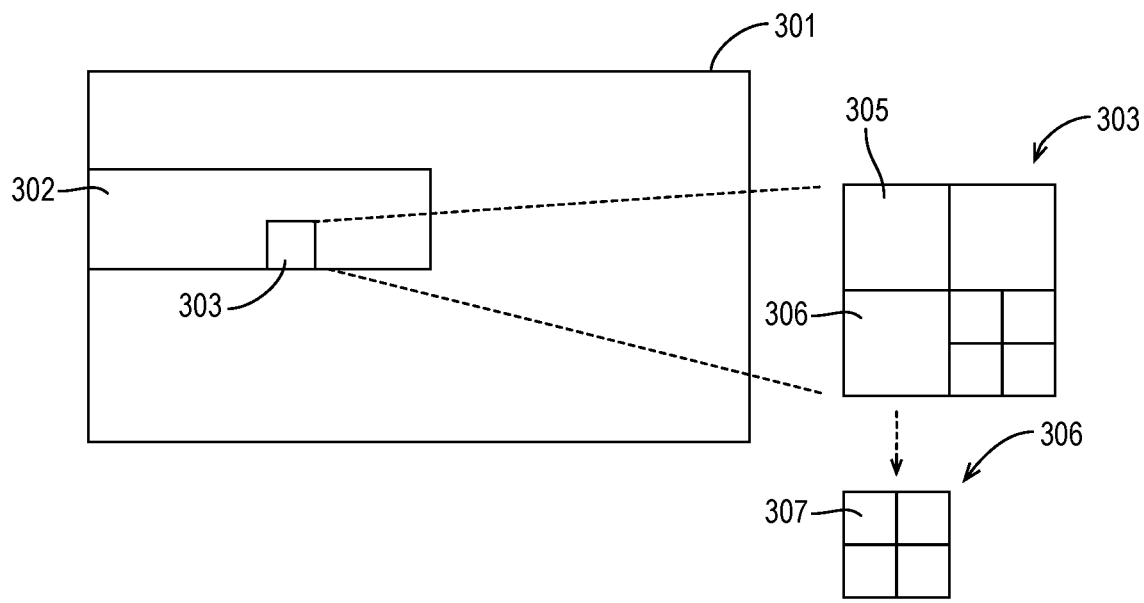
FIG. 3 illustrates an example video picture.

FIG. 3 illustrates an example video picture 301, arranged in accordance with at least some implementations of the present disclosure. Video picture 301 may include any picture of a video sequence or clip such as a VGA, HD, Full-HD, 4K, 8K, etc. video picture. For example, video picture 301 may be any of pictures 201. As shown, video picture 301 may be segmented or partitioned into one or more slices as illustrated with respect to slice 302 of video picture 301. Furthermore, video picture 301 may be segmented or partitioned into one or more largest coding units (LCUs) as illustrated with respect to LCU 303, which may, in turn, be segmented into one or more coding units as illustrated with respect to CUs 305, 306 and/or prediction units (PUs) and transform units (TUs) as shown with respect to TU 307. As used herein, the terms partition or block may refer to a CU, a PU, or a TU. Although illustrated with respect to slice 302, LCU 303, CUs 305, 306, and TUs 307, which corresponds to HEVC coding, the techniques discussed herein may be implemented in any coding context. As used herein, a region may include any of a slice, LCU, CU, picture, or other area of a picture. Furthermore, as used herein, a partition includes a portion of a block or region or the like and a sub-block is a portion of a block. For example, in the context of HEVC, a CU is a partition of an LCU. However, a partition may be any sub-region of a region, sub-block of a block, etc. The terminology corresponding to HEVC is used herein for the sake of clarity of presentation but is not meant to be limiting.

Returning to FIG. 1A, as shown, transform module 106 receives transform block 120, which may include a residual transform block or unit (e.g., a difference between a current block and a predicted block). Transform module 106 applies a transform such as a discrete cosine transform (DCT) to transform block 120 to generate transform coefficient block 121, which includes a block of transform coefficients having the same size as transform block 120. Perceptual weighting module 107 receives transform coefficient block 121 and applies a selected set of weighting parameters 119 to transform coefficient block 121 to generate a weighted transform coefficient block 122. Selected set of weighting parameters 119 includes weights or weighting parameters that may be any suitable values. In an embodiment, the weighting parameters range in values from zero to any value such as two or the like. In such embodiments, at least some of the resultant weighted transform coefficient block 122 may be larger than the corresponding values of transform coefficient block 121. In an embodiment, weights or weighting parameters are values in the range of zero to one, inclusive. Transform coefficients or quantized transform coefficients are typically integer values. Applying weighting parameters as discussed herein may result in decimal values for the resultant weighted coefficients. In any coefficient weighting operations discussed herein, a standard rounding operation may be applied to the resultant weighted coefficients as needed to provide integer values. As used herein, the term applying weighting parameters and similar terminology is meant to include such optional rounding operations as needed.

As shown, weighted transform coefficient block 122 is quantized at quantization module 108 to generate quantized (weighted) transform coefficient block 123. Quantization module 108 may apply quantization to weighted transform coefficient block 122 using any suitable technique or techniques. In some embodiments, due to some or all of weighted transform coefficient block 122 having reduced magnitudes with respect to transform coefficient block 121, some values of quantized transform coefficient block 123 may reduce to zero or to other lower values, which provides for bit rate savings for the transform coefficient block that would not otherwise be realized. Furthermore, by applying selected set of weighting parameters 119 as selected from a plurality of available sets of weighting parameters and refined as discussed herein using characteristics of the current transform block, sub-portions of the current transform block, the coding block, slice, picture, or video including the current transform block, such bit rate reduction may not compromise video quality.

Quantized transform coefficient block 123 is provided to entropy encoder for encoding and inclusion in bitstream 124 as shown. As discussed, bitstream 124 may be standards compliant and the techniques discussed herein do not impact the compliance of bitstream 124. Furthermore, quantized transform coefficient block 123 is provided to inverse quantization module 110, which inverse quantizes quantized transform coefficient block 123 to generate a reconstructed transform coefficient block 125. Reconstructed transform coefficient block 125 is inverse transformed by inverse transform module 112 to generate reconstructed transform block 126, which includes reconstructed residual values that may be combined with predicted blocks to generate reconstructed blocks for the formation of reconstructed pictures of reconstructed video 131.

As discussed, in some embodiments, selected set of weighting parameters 119 is applied to transform coefficient block 121, prior to quantization, by perceptual weighting module 107. In other embodiments, selected set of weighting parameters 119 is applied to a quantized transform coefficient block.

Figure 1B:
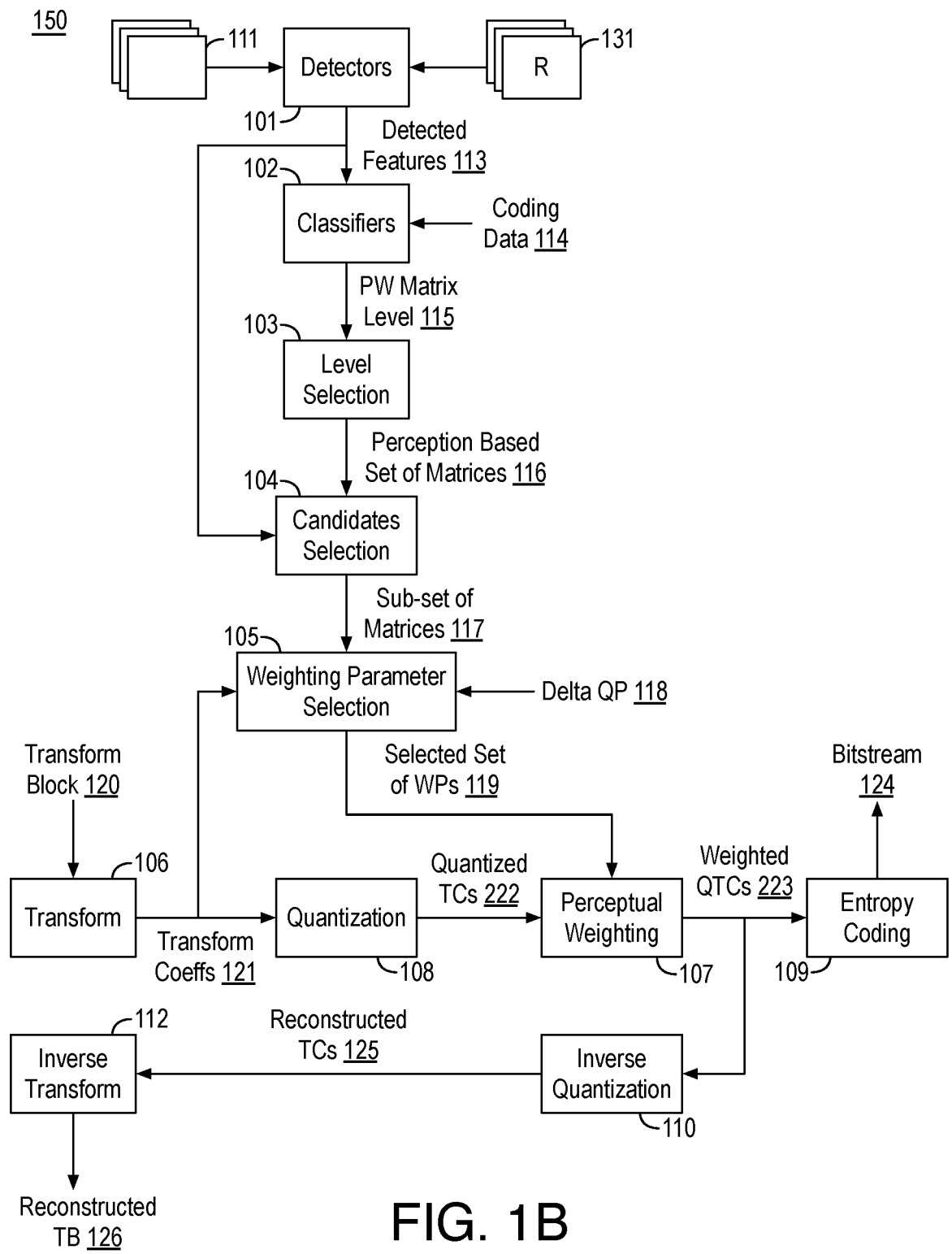
FIG. 1B is an illustrative diagram of another example system for providing video coding.

FIG. 1B is an illustrative diagram of another example system 150 for providing video coding, arranged in accordance with at least some implementations of the present disclosure. As shown in FIG. 1B, system 150 includes detector module 101, classifier module 102, level selection module 103, candidates selection module 104, weighting parameter selection module 105, transform module 106, quantization module 108, perceptual weighting module 107, entropy encoder 109, inverse quantization module 110, and inverse transform module 112.

Also as shown, in an embodiment, quantization module 108 may quantize transform coefficient block 121 to generate a quantized transform coefficient block 222 prior to application of selected set of weighting parameters 119 by perceptual weighting module 107. In an embodiment, quantized transform coefficient block 222 and selected set of weighting parameters 119 are received by perceptual weighting module 107, which applies selected set of weighting parameters 119 to quantized transform coefficient block 222 to generate (weighted) quantized transform coefficient block 223, which is provided to entropy coder 109 for encoding and inclusion in bitstream 124. Although the discussion herein focuses on selecting and applying selected set of weighting parameters 119 using transform coefficients (prior to quantization) for the sake of clarity, such techniques may be applied to quantized transform coefficients as illustrated with respect to system 150.

Returning to FIG. 1A, as discussed, selected set of weighting parameters 119 may be applied to transform coefficient block 121. Selected set of weighting parameters 119 may be applied to transform coefficient block 121 using any suitable technique or techniques. In an embodiment, transform coefficient block 121 and selected set of weighting parameters 119 are represented as a matrix of transform coefficients and a matrix of weights, respectively, such that the matrices have the same size and the elements thereof correspond to the same transform coefficient frequency. For example, transform coefficient block 121 may be a matrix of coefficients having a DC component in an upper left corner thereof and coefficients of increasing frequency components moving away from the upper left corner, as is conventional in the art. Selected set of weighting parameters 119, and other matrices of weighting parameters discussed herein, then, have weights or parameters that correspond to the transform coefficients such that application of selected set of weighting parameters 119 to transform coefficient block 121 is provided by determining the entry-wise product (i.e., Hadamard product) of matrices representing selected set of weighting parameters 119 and transform coefficient block 121. Thereby, each weight of selected set of weighting parameters 119 also corresponds to a frequency component of transform coefficient block 121.

Figure 4:
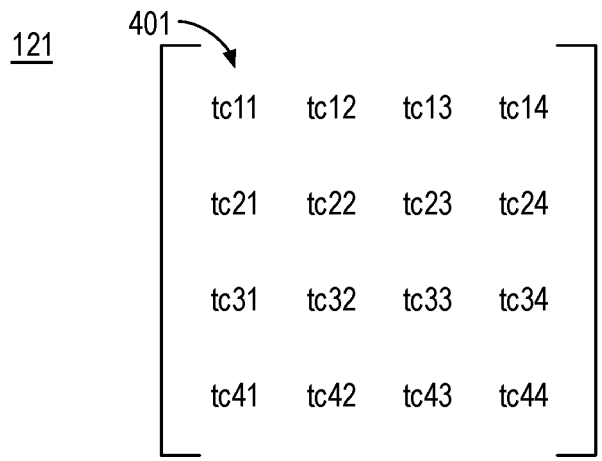
FIG. 4 illustrates an example transform coefficient block.

FIG. 4 illustrates an example transform coefficient block 121, arranged in accordance with at least some implementations of the present disclosure. In example of FIG. 4, transform coefficient block 121 is a 4×4 transform coefficient block; however transform coefficient block 121 may be any size such as 32×32, 16×16, 8×8, or 4×4 pixel block sizes. As shown, transform coefficient block 121 includes transform coefficients 401 (labeled as tc11-tc44) arranged in a matrix such that tc11 corresponds to a DC component of transform coefficient block 121 and transform coefficients corresponding to increasing frequencies are arranged at increasing distances from tc11 within the matrix. As used herein, a distance within a matrix is defined as the Manhattan distance between components or regions using a discrete value of one for any row-wise or column-wise move between components or regions. For example, the distance from tc11 to tc23 is three (over two and down one) and the distance from tc11 to tc44 is six (over three and down three), and so on.

Figure 5:
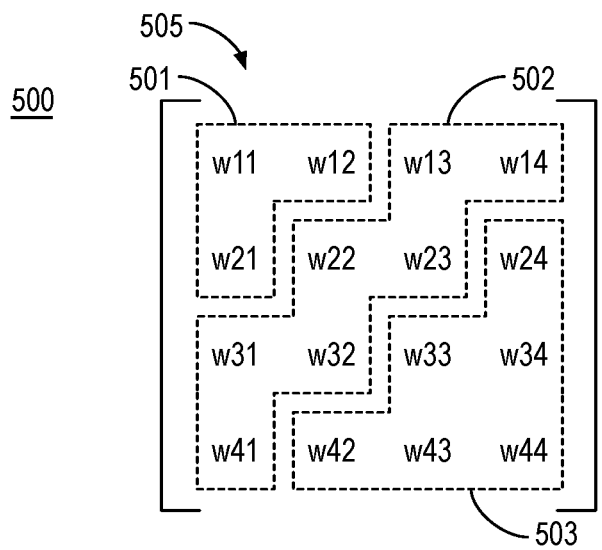
FIG. 5 illustrates an example weighting parameter matrix.

FIG. 5 illustrates an example weighting parameter matrix 500, arranged in accordance with at least some implementations of the present disclosure. In example of FIG. 5, weighting parameter matrix 500 is a 4×4 matrix of weighting parameters; however weighting parameter matrix 500 may be any size corresponding to the transform coefficient block to which it is to be applied. As shown, weighting parameter matrix 500 includes weighting parameters 505 (labeled as w11-w44) to be applied to a transform coefficient block such as transform coefficient block 121. Weighting parameters 505 are also arranged in a matrix in analogy to transform coefficient block 121 such that w11 corresponds to a DC component of transform coefficient block 121 and weights corresponding to increasing frequencies are arranged at increasing distances from w11 within the matrix. FIG. 5 also illustrates regions 501, 502, 503, which are discussed further herein below.

As discussed with respect to FIG. 1A, in an embodiment, selected set of weighting parameters 119 is applied to transform coefficient block 121 by perceptual weighting module 107 to generate weighted transform coefficient block 122. In an embodiment, selected set of weighting parameters 119 may be represented by weighting parameter matrix 500 for application to transform coefficient block 121 as illustrated in FIG. 4. In an embodiment, selected set of weighting parameters 119 is applied to transform coefficient block 121 using entry-wise multiplication.

Figure 6:
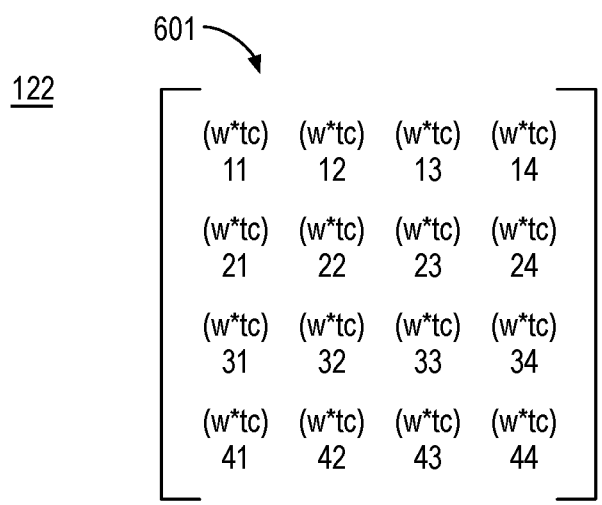
FIG. 6 illustrates an example weighted transform coefficient block.

FIG. 6 illustrates an example weighted transform coefficient block 122, arranged in accordance with at least some implementations of the present disclosure. Continuing the examples of FIGS. 4 and 5, in FIG. 6, weighted transform coefficient block 122 is a 4×4 matrix of weighted transform coefficients; however, weighted transform coefficient block 122 may be any size corresponding to transform coefficient block 121. As shown, weighted transform coefficient block 122 includes weighted transform coefficients 601 (labeled (w*tc)11-(w*tc)44) each generated by entry-wise multiplication of the entries of transform coefficient block 121 and weighting parameter matrix 500. For example, weighted transform coefficient block 122 is the entry-wise product (i.e., Hadamard product) of transform coefficient block 121 and weighting parameter matrix 500. As discussed with respect to FIG. 1B, in some embodiments, weighting parameter matrix 500 may be applied to quantized transform coefficients. For example, weighted quantized transform coefficient block 223 may be determined by entry-wise multiplication of the entries of quantized transform coefficient block 222 and weighting parameter matrix 500.

Returning to FIG. 1A, as discussed, selected set of weighting parameters 119 is selected for application to transform coefficient block 121 or quantized transform coefficient block 222. Selected set of weighting parameters 119 may be selected using any suitable technique or techniques. In an embodiment, selected set of weighting parameters 119 is selected and/or determined from a pre-determined set of perceptually-designed matrices of weighting parameters. The selection of a particular sub-set of perceptually-designed matrices of weighting parameters or a particular matrix may be based on or a function of features of the block of transform coefficient block 121 or quantized transform coefficient block 222, the transform block including transform coefficient block 121 or quantized transform coefficient block 222, a region of the picture including transform coefficient block 121 or quantized transform coefficient block 222, the picture including transform coefficient block 121 or quantized transform coefficient block 222, or the input video including transform coefficient block 121 or quantized transform coefficient block 222. For example, the weighting matrices may be defined as a function of various classifier outputs or features including block size (i.e., transform block size), resolution (i.e., video resolution), video encode mode (i.e., high quality/slow encode mode or low quality/fast encode mode for input video 111), the coding mode of the block (i.e., inter or intra), and temporal layer of the slice or picture including the transform block (i.e., as discussed with respect to FIG. 2).

With reference to FIG. 5, weighting parameter matrix 500 illustrates an example weighting matrix. As shown, weighting parameter matrix 500 may be divided into regions 501, 502, 503, which may be alternatively characterized as zones or areas, such that different regions have different weighting parameters. For example, in region 501, weights w11, w12, w21 may be the same (e.g., about 0.9), in region 502, weights w13, w14, w22, w23, w31, w32, w41 may be the same (e.g., about 0.5), and in region 503, weights w24, w33, w34, w42, w43, w44 may be the same (e.g., about 0.1). Furthermore, in some embodiments, the weights in region 501 are greater than those in region 502, which are greater than those in region 503. In other embodiments, weights may vary within regions but all weights in region 501 are greater than those in region 502, which are greater than those in region 503. In yet other embodiments, weights may vary within regions and not all weights are uniformly decreasing across regions. As will be appreciated, weighting parameters 505 may include any suitable values in various implementations to provide human visual system optimized transform coefficient shaping.

As shown in FIG. 5, weighting parameter matrix 500 (e.g., each weighting matrix or one or more matrices available for selection) may be divided into regions 501, 502, 503 according to the importance of the transform coefficients corresponding to weighting parameters 505. For example, the weight for the DC component (i.e., w11) and other weights close to the DC coefficient weight form region 501 (e.g., an Area_0) as the transform coefficients corresponding to region 501 are often the most important and the weights therein may be the largest such that the corresponding transform coefficients are least affected by the weighting. As shown, region 502 (e.g., an Area_1) may include other surrounding weights. Subsequent regions moving away from the DC coefficient weight are defined in a layered manner such that the impact of the weighting increases the farther two-dimensional-wise the weight is from the DC weight. Thereby, the high frequency transform coefficients are the most affected by the weighting.

Weighting parameter matrix 500 illustrates an example of a weighting matrix with three defined regions; however any number of regions may be used. In an embodiment, the DC component is in a region of its own. In an embodiment, weighting parameter matrix 500 has decreasing weights corresponding to higher frequency components of the block of transform coefficients such that the weighting parameters include a first weight corresponding to a first component of the block of transform coefficients and a second weight corresponding to a second component of the block of transform coefficients representing a higher frequency component than the first component such that the first weight is greater than the second weight. In an embodiment, weighting parameter matrix 500 has a number of consecutive contiguous regions 501, 502, 503 with a first region 501 including a weight for a DC component (w11) and each subsequent region 502, 503 is further from the DC component such that each subsequent region 502, 503 comprises weights that are all less than all weights from each previous region.

Figure 7:
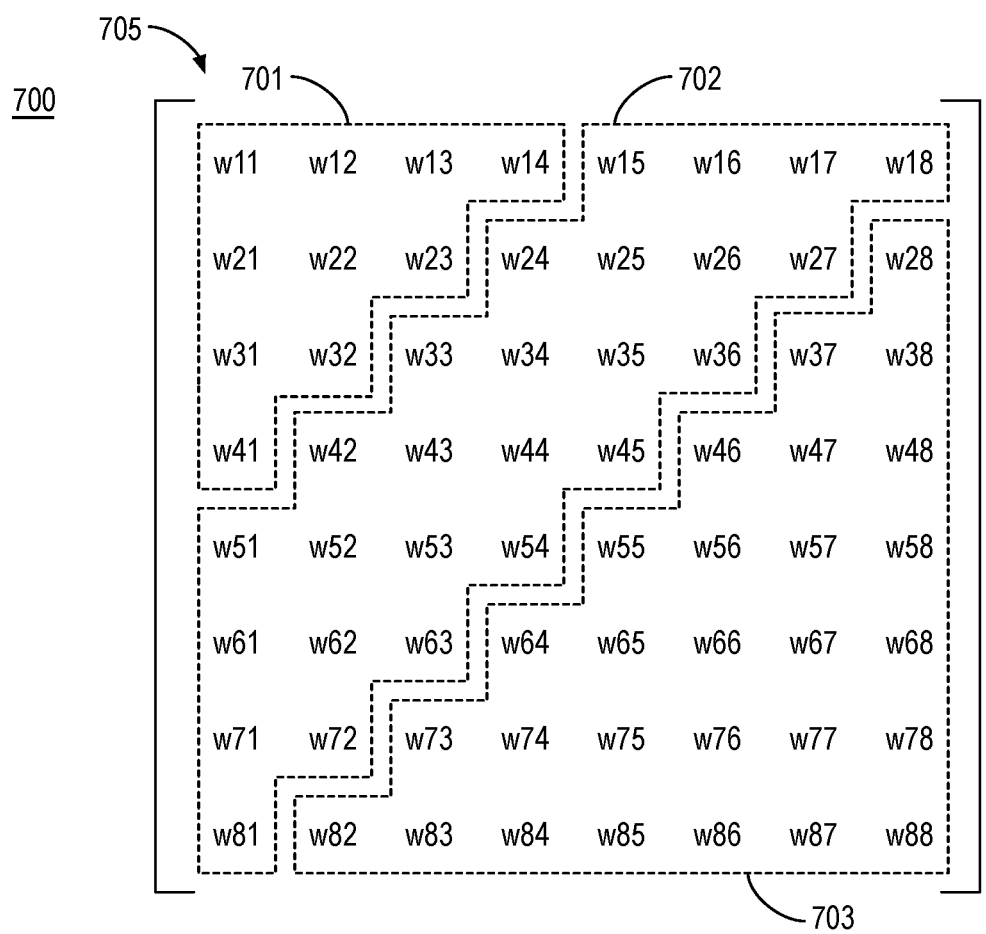
FIG. 7 illustrates another example weighting parameter matrix.

FIG. 7 illustrates another example weighting parameter matrix 700, arranged in accordance with at least some implementations of the present disclosure. In the example of FIG. 7, weighting parameter matrix 700 is an 8×8 matrix of weighting parameters. As shown, weighting parameter matrix 700 includes weighting parameters 705 (labeled as w11-w88) to be applied to a transform coefficient block such as transform coefficient block 121. As shown, weighting parameter matrix 700 may be divided into regions 701, 702, 703, which may be alternatively characterized as zones or areas, such that different regions have different weighting parameters. In an embodiment, in regions 701, 702, 703, the weights are the same within each region. Furthermore, in some embodiments, the weights in region 701 are greater than those in region 702, which are greater than those in region 703. In other embodiments, weights may vary within regions but all weights in region 701 are greater than those in region 702, which are greater than those in region 703. In yet other embodiments, weights may vary within regions and not all weights are uniformly decreasing across regions. As will be appreciated, weighting parameters 705 may include any suitable values in various implementations. As discussed, weighting parameter matrix 700 may be divided into regions 701, 702, 703 according to the importance of the transform coefficients corresponding to weighting parameters 705. For example, the weight for the DC component (i.e., w11) and other weights close to the DC coefficient weight form region 701 (e.g., an Area_0) as the transform coefficients corresponding to region 501 are often the most important and the weights therein may be the largest such that the corresponding transform coefficients are least affected by the weighting. As shown, region 702 (e.g., an Area_1) may include other surrounding weights. Subsequent regions moving away from the DC coefficient weight are defined in a layered manner such that the impact of the weighting increases the farther two-dimensional-wise the weight is from the DC weight. Thereby, the high frequency transform coefficients are the most affected by the weighting. Weighting parameter matrix 700 illustrates an example of a weighting matrix with three defined regions; however, any number of regions may be used.

Example weighting parameter matrices 500, 700 represent selected sets of weighting parameters 119 as well as the matrices or sets of weighting parameters from which selected set of weighting parameters 119 are selected and/or refined. For example, any number of weighting parameter matrices such as weighting parameter matrices 500, 700 (in any sizes) may be available for selection and/or refinement such that selected set of weighting parameters 119 is generated for application to transform coefficient block 121 or quantized transform coefficient block 222. For example, any number of matrices such as weighting parameter matrices 500, 700 may be provided as perceptually-designed matrices for selection and refinement to generate selected set of weighting parameters 119. Discussion now turns to selection and/or refinement of weighting parameter matrices from predefined perceptually-designed matrices of weighting parameters.

Figure 8:
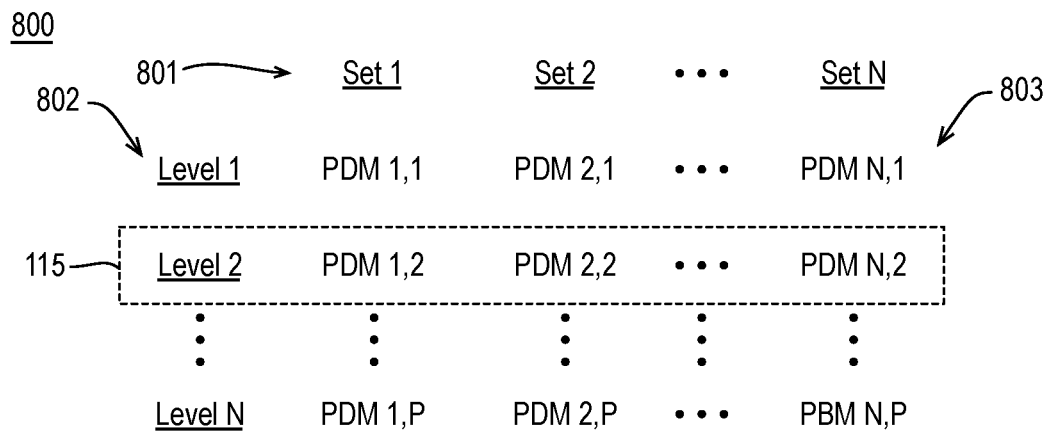
FIG. 8 illustrates an example data structure including multiple perceptually-designed matrices.

FIG. 8 illustrates an example data structure 800 including multiple perceptually-designed matrices, arranged in accordance with at least some implementations of the present disclosure. As shown in FIG. 8, perceptually-designed matrices 803 (PDM) of different sizes, aggressiveness, weight parameter regions, weight parameter variations, etc.

may be organized into sets 801 and levels 802 thereof. For example, each set of sets 801 may include perceptually-designed matrices 803 grouped by how aggressive the impact of application of perceptually-designed matrices 803. For example, more aggressive perceptually-designed matrices 803 have weighting values that deviate from values of one with respect to less aggressive perceptually-designed matrices 803. For example, a no impact perceptually-designed matrix would have all values therein equal to one. More aggressive perceptually-designed matrices 803 may then be defined as those that have a greater deviation (typically toward zero) from all values of one than those of less aggressive perceptually-designed matrices 803.

Furthermore, each level of levels 802 may include a set of perceptually-designed matrices 803 that refine selection of perceptually-designed matrices 803 based on classifiers corresponding to a transform coefficient block (either quantized or not) as discussed further herein. For example, within each set of sets 801, several refinements levels 802 may be defined to further tune the impact of the weighting. Level 1 may correspond to little or no impact or to the least impact, level 2 may have a greater impact, and so on through level N, which would correspond to the most severe impact. For example, perceptually-designed matrices 803 may be more aggressive with increasing levels 802. Perceptually-designed matrices 803 may also be more aggressive with increasing sets 801. The selected level for a particular transform coefficient block may be dependent on multiple parameters or classifiers such as, for example, block size of the transform coefficient block (e.g., 4×4, 8×8, etc.), temporal layer of the transform coefficient block (e.g., base layer, non base layer L1s, etc.), block coding mode (e.g., inter vs. intra), video encode mode (i.e., high quality/slow encode mode or low quality/fast encode mode for input video 111), and detector inputs or such as logo detectors (e.g., is the transform coefficient block in a region having a logo), a strong moving edge or sparks detectors (e.g., is the transform coefficient block in a region having strong moving edges).

For example, with reference to FIGS. 1A and 8, detector module 101 may generate detected features 113 (which may also be characterized as classifiers) and classifier module 102 may determine, using detected features 113, coding data 114, and other optional classifiers (not shown), a perceptual weighting matrix level of levels 802, as indicated by perceptual weighting matrix level indicator 115. For example, for a particular weighting matrix level indicator 115, level 2 may be selected for a particular transform coefficient block 121. As will be appreciated, any particular level (i.e., 1 through N) may be selected for any particular transform coefficient block 121. For the illustrated weighting matrix level indicator 115, the selection of level 2 selects a subset of N matrices (PDM 1, 2, PDM 2,2, . . . , PDM N,2) of weighting parameters from perceptually-designed matrices 803 of weighting parameters. As shown in FIG. 1A, level selection module 103 receives perceptual weighting matrix level indicator 115 indicative of a level for the current transform coefficient block and level selection module 103 selects the corresponding subset of N matrices (PDM 1, 2, PDM 2,2, . . . , PDM N,2) of weighting parameters, which are provided as perceptually-designed set of matrices 116 to candidate selection module 104.

As shown, candidate selection module 104 receives perceptually-designed set of matrices 116 and selects a subset of perceptually-designed set of matrices 117 for further evaluation and/or refinement. For example, the subset of N matrices may be used to define M (i.e., M≤N) candidate perceptually-designed matrices for further evaluation. The M perceptually-designed matrices may be selected on a coding block (e.g., LCU) level based on detector information as discussed further below, and the M perceptually-designed matrices are provided by subset of matrices 117. For example, the use of spatiotemporal detectors may isolate areas where perceptual weighting is likely to yield undesirable visual quality artifacts. In such areas, perceptual weighting is made less aggressive or disabled altogether. The use of detectors (e.g., a logo detector, strong moving edge or sparks detector) allows systems 100, 150 to reduce bit rate substantially without introducing visible video quality artifacts.

Subset of matrices 117 are provided to weighting parameter selection module 105, which selects selected set of weighting parameters 119 for application to transform coefficient block 121 or quantized transform coefficient block 222 (please refer to FIG. 1B). Weighting parameter selection module 105 may select, optionally using delta QP data 118, selected set of weighting parameters 119 using any suitable technique or techniques. In an embodiment, weighting parameter selection module 105 applies each matrix of subset of matrices 117 to the current transform coefficient block, quantizes each resultant weighted transform coefficient block if needed (i.e., not needed if the transform coefficient block is a quantized transform coefficient block), inverse quantizes each weighted quantized transform coefficient block to generate reconstructed sub-blocks of transform coefficients, and generates a coding cost for each matrix using the inverse reconstructed sub-blocks of transform coefficients and the current transform coefficient block (un-quantized) as discussed with respect to FIG. 11. In another embodiment, sub-matrices of each matrix of subset of matrices 117 are applied to a corresponding sub-block of the transform coefficient block and coding costs for each sub-matrix are generated with selected set of weighting parameters 119 being populated with the lowest cost sub-matrix for each sub-block as discussed with respect to FIG. 12.

In any event, selected set of weighting parameters 119 is selected and/or refined from subset of matrices 117 by weighting parameter selection module 105, which provides selected set of weighting parameters 119 to perceptual weighting module 107 for application to transform coefficient block 121 or quantized transform coefficient block 222 as discussed with respect to FIGS. 1A and 1B.

Figure 9:
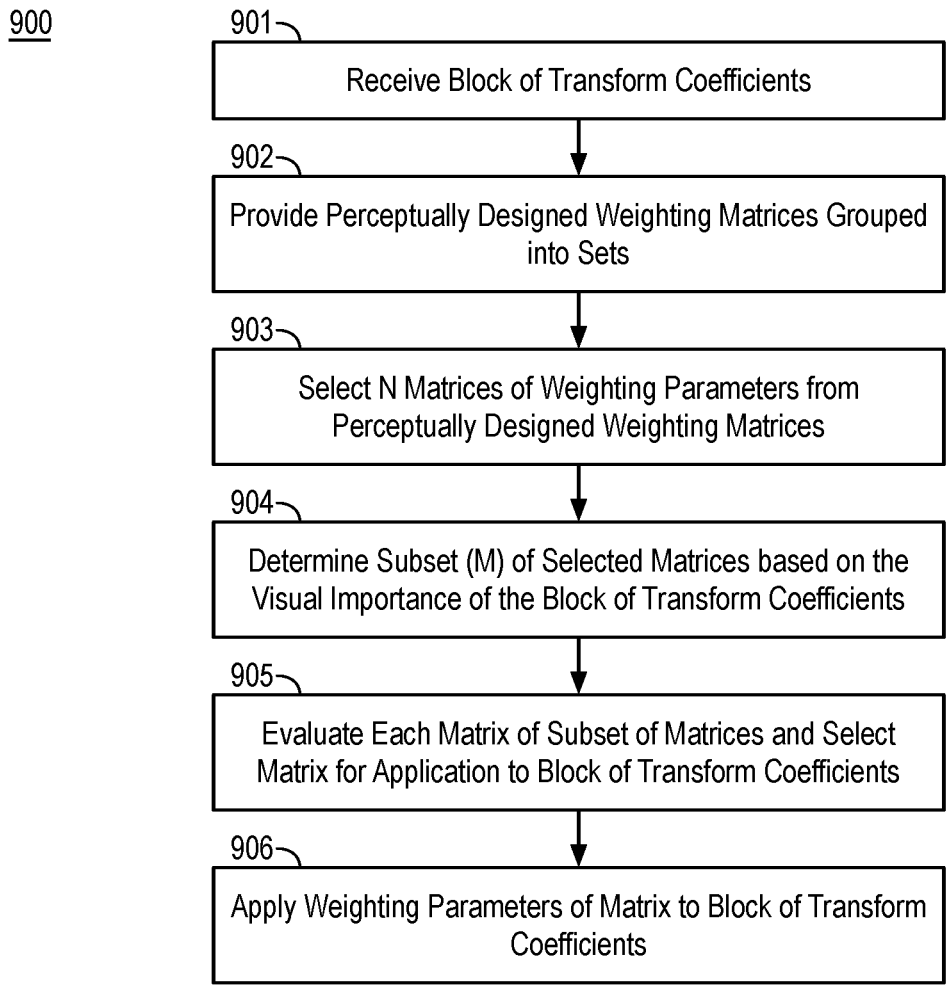
FIG. 9 is a flow diagram illustrating an example process for selecting and applying weighting parameters to a block of transform coefficients.

FIG. 9 is a flow diagram illustrating an example process 900 for selecting and applying weighting parameters to a block of transform coefficients, arranged in accordance with at least some implementations of the present disclosure. Process 900 may include one or more operations 901-906 as illustrated in FIG. 9 and process 900 may be performed by a system (e.g., system 100, system 150, etc.) to provide human visual system optimized transform coefficient shaping for video encoding.

Process 900 begins at operation 901, where, a block of transform coefficients is received for processing. The block of transform coefficients may be quantized or un-quantized. For example, the block of transform coefficients may be quantized transform coefficient block 222 received by perceptual weighting module 107 of system 150 or transform coefficient block 121 received by perceptual weighting module 107 of system 100. Processing continues at operation 902, where perceptually designed weighing matrices are provided and grouped into sets. For example, the perceptually designed weighing matrices may be predesigned using empirical techniques and grouped into sets of increasing aggressiveness or severity as discussed with respect to FIG. 8.

Processing continues at operation 903, where a subset of matrices of weighting parameters are selected for the block of transform coefficients from the perceptually-designed matrices of weighting parameters discussed with respect to operation 902 based on one or more classifiers corresponding to the block of transform coefficients. For example, based on the classifiers corresponding to the block of transform coefficients, a level of perceptually-designed matrices of weighting parameters may be selected across sets of increasing aggressiveness of perceptually-designed matrices of weighting parameters. For example, classification module 102 may use coding data 114 including coding data corresponding to the block of transform coefficients and/or detected features 113 (which may also be characterized as classifiers) from detector module 101 to determine the level for the block of transform coefficients.

For example, the received block of transform coefficients corresponds to a transform block, which may be part of a coding block, part of a largest coding block, part of a slice, and/or part of a picture. The classifiers may be at any such level (transform block level, coding block level, largest coding block level, slice level, picture level, or even input video coding mode level). The classifiers used to select the level may include one or more of a block size of the transform block (e.g., 4×4, 8×8, etc.), a resolution of the picture (e.g., Full-HD, 4 k, etc.), an encode mode of a coding block including the transform block (e.g., inter, merge, intra, etc.), a coding mode of input video 111 (e.g., slow/high quality encode, fast/low quality encode, etc.), a temporal layer of a picture or a slice that includes the transform block (e.g., base layer, non-base layer, etc.), an indicator the transform block is in a logo region (e.g., the region being a coding block, largest coding, slice, or other region), or an indicator the transform block is in a region having strong moving edges (e.g., the region being a coding block, largest coding, slice, or other region).

As discussed, the selected level for a block of transform coefficients is dependent on multiple classifiers. An example of the level selection mechanism is given in Table 1.

TABLE 1

| Level | Description |
| --- | --- |
| Level_0 (no weighting) | LOGO in I_SLICE or 32 × 32 non-DC/Planar Intra Blocks |
| Level_1 | I_SLICE or LOGO in non I_SLICE |
| Level_2 | Base layer pictures, Intra blocks or region having strong moving edges in non-base layer pictures or LOGO |
| Level_3 | Base layer pictures, Inter blocks |
| Level_4 | Reference pictures, Intra blocks |
| Level_5 | Reference pictures, Inter blocks |
| Level_6 | Non-Reference pictures, Intra blocks |
| Level_7 | Non-Reference pictures, Inter blocks |

As discussed, increasing levels may include more aggressive matrices. In an embodiment, all else being equal, a greater resolution of the picture may provide for selection of a higher (more aggressive) level. In an embodiment, all else being equal, an encode mode of a coding block including the transform block indicating an intra coding mode that is neither DC nor planar mode may provide for selection of a lower (less aggressive) level. In an embodiment, all else being equal, a slower and/or higher quality encode mode may provide for selection of a lower (less aggressive) level. In an embodiment, all else being equal, a lower temporal layer of a picture or a slice that includes the transform block may provide for selection of a lower (less aggressive) level. In an embodiment, all else being equal, an indicator the transform block is in a logo region may provide for selection of a lower (less aggressive) level. In an embodiment, all else being equal, an indicator the transform block is in a region having strong moving edges may provide for selection of a lower (less aggressive) level. As will be appreciated, the opposite of each of the above classifiers will result in an opposite response in the matrix aggressiveness level.

As discussed, detector module 101 may provide an indicator as to whether a region includes a LOGO. In an embodiment, a LOGO region indicator is generated by detecting edges within the region and determining the edges are substantially stationary across pictures of input video 111. For example, a stationary edge over time flag or indicator may be set for a region (e.g., LCU) when the count of blocks (e.g., 16×16 blocks) within the region that are marked as edge blocks over a predetermined number of pictures (e.g., 4 or more) in a look-ahead window of pictures is met. In an embodiment, a LOGO region indicator is set when the stationary edge over time indicator is set or a predetermined percentage of picture regions (e.g., LCUs) have a low variance. Furthermore, detector module 101 may provide an indicator as to whether a region has strong moving edges (e.g., which may appear as sparks). In an embodiment, a strong moving edges region indicator is generated in response to detecting the region is a high contrast region and that the region has high motion therein across pictures of input video 111. For example, a strong moving edges region indicator may be generated for a region when the region has high contrast (e.g., a percentage of pixels with luma values below a specified value is greater than a threshold and the percentage of pixels with luma values above a specified value is greater than a given threshold), the region has sharp edges (e.g., the region has high variance as indicated by the region (LCU) containing more than a particular number, such as four, very low variance blocks, such as 16×16 blocks), and the region has a mean that is not more than a threshold different than a mean of a reference region (e.g., the reference region being collocated in a reference picture), and either the region has a variance that is not more than a threshold different than the variance of the reference region or the region has a relative variance difference that is not more than a threshold (i.e. (variance of the region−variance of the reference region)/ (variance of the reference region) is not more than a threshold). However, such LOGOs and strong moving edges may be detected using any suitable technique or techniques.

As discussed, operation 903 determined a subset of N matrices of the matrices provided at operation 902 such that the N matrices are suitable based on the discussed classifiers as well as having varying aggressiveness among the N matrices. For example, matrix 1 may be the least aggressive and matrix N may the most aggressive as discussed herein.

Processing continues at operation 904, where a subset (M) of the N matrices may be determined based on the visual importance of the block of transform coefficients (or a region including the transform block corresponding to the block of transform coefficients).

Figure 10:
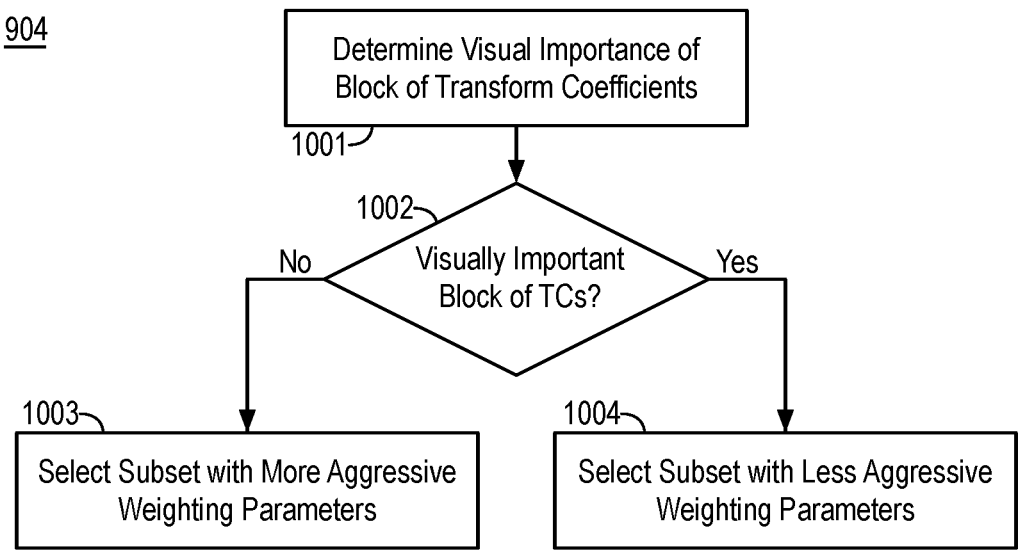
FIG. 10 is a flow diagram illustrating an example process for selecting a subset of matrices based on visual importance.

FIG. 10 is a flow diagram illustrating an example process implemented, for example, at operation 904 for selecting a subset of matrices based on visual importance, arranged in accordance with at least some implementations of the present disclosure. The process may include one or more operations 1001-1004 as illustrated in FIG. 10 and the process may be performed by a system (e.g., system 100, system 150, etc.) to provide human visual system optimized transform coefficient shaping for video encoding.

Processing may begin at operation 1001, where the visual importance of a current block of transform coefficients is determined. For example, candidates selection module 104 may use detected features 113 (which may also be characterized as classifiers) from detector module 101 to determine whether the block of transform coefficients is visually important, is in a visually important region, or the like. The determination as to whether the block of transform coefficients is in a visually important region may be made using any suitable detector(s). In an embodiment, the block of transform coefficients is in a visually important region when the region (e.g., coding block, largest coding block, slice, or other region) is a high activity region as detected based on spatio-temporal activity. In an embodiment, activity level is measured based on the sum of absolute difference (SAD) between collocated LCUs of consecutive pictures of input video using optionally decimated input video (e.g., 1/16th decimated) to assign an activity level to each LCU. In an embodiment, the activity level of collocated LCUs is averaged over a number pictures (e.g., over time) and the average is used as an activity level for the LCU. In an embodiment, the block of transform coefficients is in a visually important region when the frame rate of input video 111 is smaller than or equal to a threshold such as 30 frames per second. For example, classifiers to indicate whether the transform block is visually important may include at least one of an activity level of a coding block (e.g., CU or LCU) that includes the transform block or a frame rate of the input video.

Processing continues at decision operation 1002, where a determination may be made as to whether the current block of transform coefficients is visually important based on the results of operation 1001. As shown, when the current block of transform coefficients is not visually important, processing continues at operation 1003 where a subset of matrices with more aggressive weighting parameters are selected and, when the current block of transform coefficients is visually important, processing continues at operation 1004 where a subset of matrices with less aggressive weighting parameters are selected. For example, when the block of transform coefficients is deemed visually important, a subset of less aggressive matrices are selected and, if not, a subset of more aggressive matrices are selected. As used herein a subset of less aggressive matrices is a subset having at least one matrix that is less aggressive with respect to another subset of matrices and with no matrix being more aggressive. Similarly, a subset of more aggressive matrices is a subset having at least one matrix that is more aggressive with respect to another subset of matrices and with no matrix being less aggressive.

In an embodiment, with reference to FIG. 8, selection of less or more aggressive matrices may proceed as follows. As discussed, perceptually-designed matrices 803 may be more aggressive with increasing sets 801 (i.e., at a particular level, the matrix of set 2 is more aggressive than the matrix of set 1, the matrix of set 3 is more aggressive than the matrix of set 2, and so on). When the block of transform coefficients is deemed visually important and assuming level 2, for example, a less aggressive subset of matrices are selected. Such matrices may include matrices PDM 1,2 through PDM X,2 such that 1<X<N. Thereby, a less aggressive subset is selected (e.g., corresponding to set 1 through set X) for visually important blocks of transform coefficients. Conversely, for non-visually important transform coefficients, a more aggressive subset of matrices is selected. Such matrices may include matrices PDM Y,2 through PDM N,2 such that 1<Y<N. Thereby, a more aggressive subset is selected (e.g., corresponding to set Y through set N) for non-visually important blocks of transform coefficients. X and Y may be any suitable values including the same values. However, the subset of matrices of less or more aggressive matrices may be selected using any suitable technique or techniques. For example, for the case where N=4 and M=3 (i.e. three candidate matrix sets corresponding to aggressive, average, and mild impact are to be selected), detectors based on LCU block activity and on the input frame rate may be considered, as indicated in Table 2.

TABLE 2

| Perceptual Weighting Matrix Candidate | Description |
| --- | --- |
| Candidate Set_0 | Set_0 |
| Candidate Set_1 | Set_1 |
| Candidate Set_2 | If LCU activity level higher than TH1 or lower than TH2 then Set_3, else if frame rate higher than TH3 fps then Set_2, else Set_1 |

As shown, in such an embodiment, four matrices (e.g., corresponding to a particular level as discussed with respect to operation 903) are selected and a subset (size M) from the subset (size N) are then selected by keeping the least aggressive two matrices (as identified as Set_0 and Set_1) and determining whether to keep a more aggressive matrix (Set_3) or a less aggressive matrix (Set_2) or neither depending on classifiers or features of the LCU and video input of the block of transform coefficients. As shown, if the LCU activity is greater than a first threshold or less than second threshold, a more aggressive matrix is selected; else if a frame rate is greater than a third threshold, a more aggressive matrix is selected; else no additional matrix is selected.

Returning to FIG. 9, processing continues at operation 905, where each matrix of the subset of selected matrices are evaluated and a matrix is selected for application to the block of transform coefficients. The subset of selected matrices may be evaluated using any suitable technique or techniques such as those discussed with respect to FIG. 11 as discussed below. In other embodiments, the block of transform coefficients and the selected matrices may be divided into sub-blocks and sub-matrices, respectively, and each sub-matrix may be evaluated and the resultant matrix may be populated using the selected sub-matrix for each sub-block as is discussed with respect to FIG. 12 and elsewhere herein.

Figure 11:
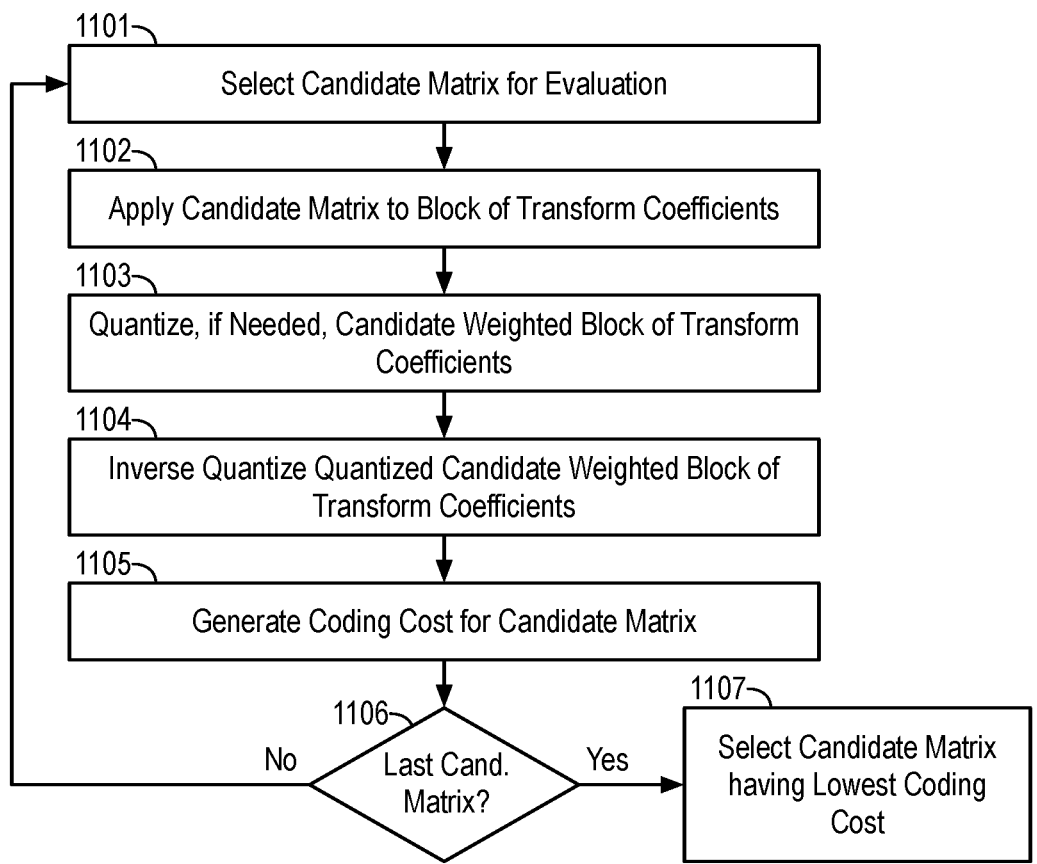
FIG. 11 is a flow diagram illustrating an example process for selecting a matrix for implementation based on a subset of matrices.

FIG. 11 is a flow diagram illustrating an example process implemented, for example, at operation 905 for selecting a matrix for implementation based on a subset of matrices, arranged in accordance with at least some implementations of the present disclosure. The process may include one or more operations 1101-1107 as illustrated in FIG. 11 and the process may be performed by a system (e.g., system 100, system 150, etc.) to provide human visual system optimized transform coefficient shaping for video encoding. For example, the process may be performed by weighting parameter selection module 105.

Processing may begin at operation 1101, where a candidate matrix is selected for evaluation. For example, a candidate matrix may be selected from the subset of candidate matrices determined at operation 904. Processing continues at operation 1102, where the selected candidate matrix is applied to the block of transform coefficients as discussed with respect to FIG. 6. In some embodiments, the block of transform coefficients is un-quantized and the result may be characterized as a block of weighed transform coefficients. In some embodiments, the block of transform coefficients has been quantized and the result may be characterized as a block of weighted quantized transform coefficients. Processing continues at operation 1103, where, if needed, the resultant block of weighted transform coefficients may be quantized. For example, the resultant block is quantized when the block of transform coefficients was un-quantized at operation 1102.

Processing continues at operation 1104, where the weighted quantized transform coefficients are inverse quantized. The weighted quantized transform coefficients may be inverse quantized using any suitable technique or techniques to generate a reconstructed block of transform coefficients. Processing continues at operation 1105, where a coding cost is generated for the candidate matrix. For example, the coding cost may be generated based on a comparison of the reconstructed block of transform coefficients to the un-quantized block of transform coefficients and an estimated or actual bit rate. For example, the coding cost may be a rate distortion cost. If an un-quantized block of transform coefficients is used at operation 1102, those are used for comparison. If a quantized block of transform coefficients is used at operation 1102, the corresponding block of transform coefficients is retrieved and used for comparison. Processing continues at decision operation 1106, where a determination is made as to whether the current candidate matrix under evaluation is a last candidate matrix. If not, processing continues at operations 1101-1105 as discussed for a next candidate matrix. If so, processing continues at operation 1107, where a matrix having a lowest coding cost is selected for application to the current block of transform coefficients.

Returning to FIG. 9, processing continues at operation 906, where the selected weighting parameters of the selected perceptual weighting matrix are applied to the block of transform coefficients (either un-quantized or quantized). For example, the selected weighting parameters may be applied to the block of transform coefficients by perceptual weighting module 107 as discussed with respect to systems 100, 150.

As discussed, in some embodiments, each matrix of a number of candidate matrices are evaluated by applying each matrix (as a whole) to a current block of transform coefficients and evaluating the costs based on the application. In other embodiments, the block of transform coefficients is divided into sub-blocks and each matrix is also divided into sub-matrices and each candidate sub-matrix (e.g., one for each candidate matrix) is applied to each sub-block and the lowest cost sub-matrix is used to populate a final matrix. That is, the final matrix may include weights of sub-matrices from more than one of the candidate matrices. Furthermore, the cost evaluation may be further based on classifiers and coding data corresponding to the block of transform coefficients as is discussed further herein.

Figure 12:
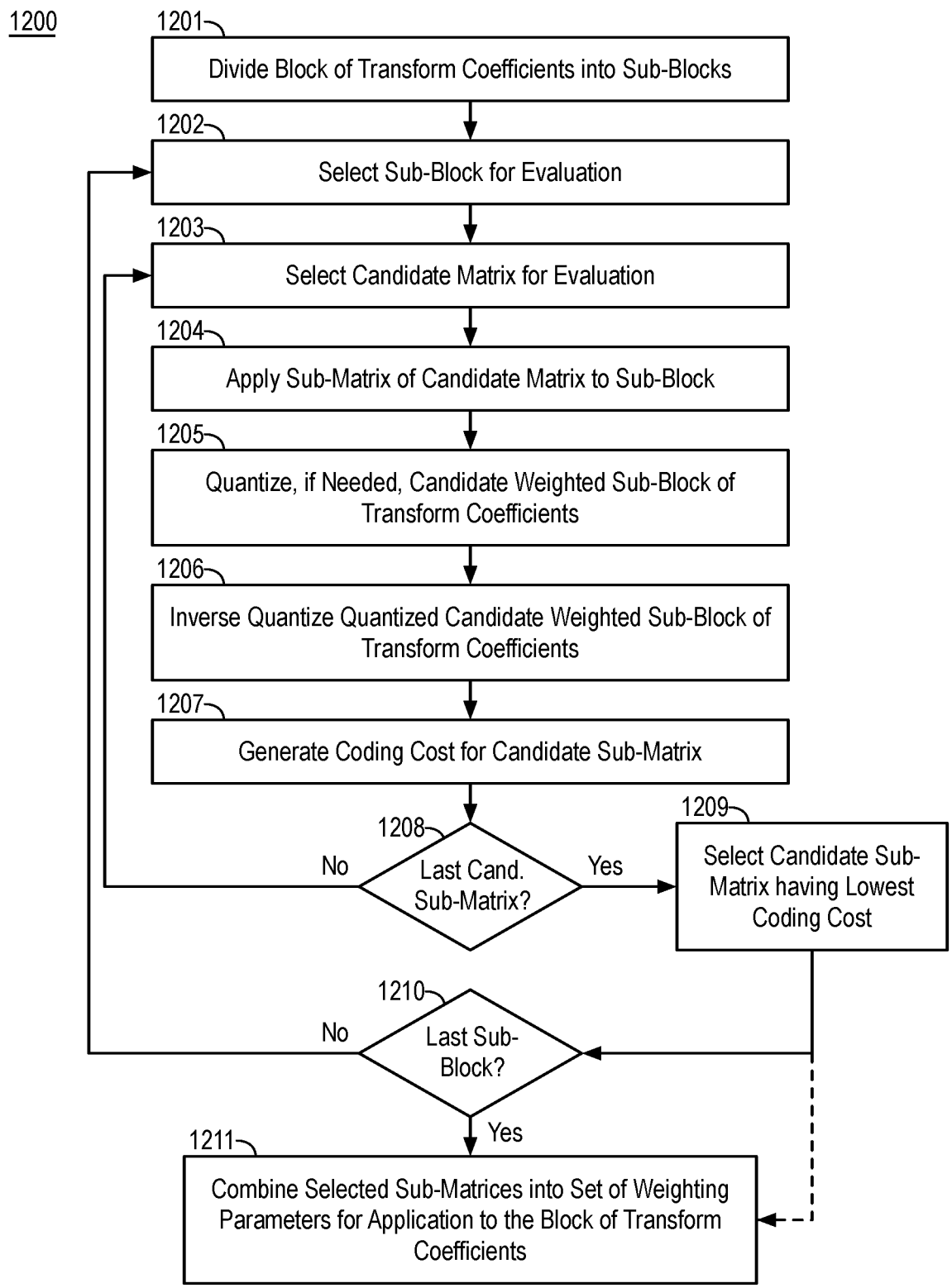
FIG. 12 is a flow diagram illustrating an example process for selecting and applying weighting parameters for application to a block of transform coefficients.

FIG. 12 is a flow diagram illustrating an example process 1200 for selecting and applying weighting parameters for application to a block of transform coefficients, arranged in accordance with at least some implementations of the present disclosure. Process 1200 may include one or more operations 1201-1211 as illustrated in FIG. 12 and process 1200 may be performed by a system (e.g., system 100, system 150, etc.) to provide human visual system optimized transform coefficient shaping for video encoding. For example, process 1200 may be performed by weighting parameter selection module 105.

For example, process 1200 may provide a weighting refinement process applied to sub-blocks of coefficients using sub-weighting matrices. In the following discussion a 4×4 sub-block and sub-matrix size is used as an example; however, any size and shape of sub-blocks and sub-matrices may be used. Furthermore, the sub-block sizes do not have to be uniform within a transform block (e.g., TU). That is, difference sub-block sizes may be considered within the same transform block (e.g., TU).

Process 1200 begins at operation 1201, where a block of transform coefficients (un-quantized or quantized) is received and divided into two or more sub-blocks. In an embodiment, the block of transform coefficients is divided into four equal sized square sub-blocks. However, any size and shape of sub-blocks that are the same or different may be used.

Figure 13:
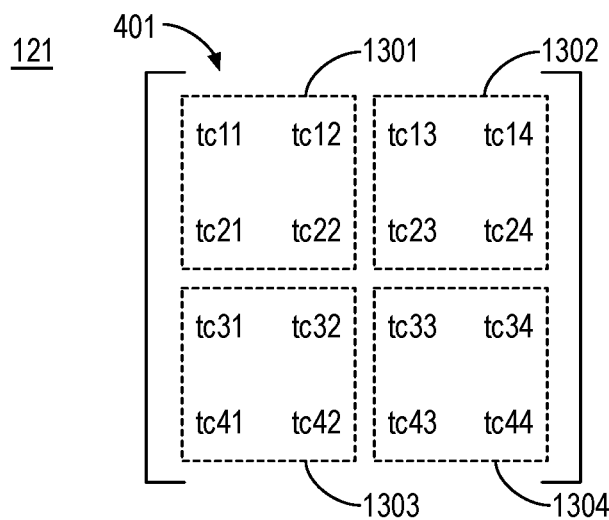
FIG. 13 illustrates an example transform coefficient block divided into example sub-blocks.

FIG. 13 illustrates example transform coefficient block 121 divided into example sub-blocks 1301, 1302, 1303, 1304, arranged in accordance with at least some implementations of the present disclosure. In example of FIG. 13, transform coefficient block 121 is again presented as a 4×4 transform coefficient block; however, transform coefficient block 121 may be any size such as 32×32, 16×16, 8×8, or 4×4 pixel block sizes. As discussed, transform coefficient block 121 includes transform coefficients 401 (labeled as tc11-tc44) arranged in a matrix such that tc11 corresponds to a DC component of transform coefficient block 121 and transform coefficients corresponding to increasing frequencies are arranged at increasing distances from tc11 within the matrix. As shown in FIG. 13, transform coefficient block 121 may be divided into four sub-blocks 1301, 1302, 1303, 1304 such that sub-blocks 1301, 1302, 1303, 1304 are each square and each have the same number of transform coefficients 401. In other embodiments, sub-blocks 1301, 1302, 1303, 1304 are different sizes and/or different shapes and/or have fewer or more than four sub-blocks. In an embodiment, sub-blocks 1301, 1302, 1303, 1304 are the same size and shapes as regions 501, 502, 503 as discussed with respect to FIG. 5.

Returning to FIG. 12, processing continues at operation 1202, where a sub-block is selected for evaluation. With reference to FIG. 13, sub-block 1301 may be selected for evaluation, followed by sub-blocks 1302, 1303, 1304, in turn.

Processing continues at operation 1203, where a candidate matrix is selected for evaluation. For example, the candidate matrix may be one of multiple candidate matrices selected as discussed with respect to operations 903 and 904.

In addition, operation 1203 may optionally further prune the number of candidate matrices. For example, such pruning may be based on the encode mode of input video 111 (e.g., slow/high quality encode, fast/low quality encode, etc.), the distance of the current sub-block from a DC component (e.g., the importance of the current sub-block), and/or the temporal layer of a picture or a slice that includes the current sub-block. For example, if the encode mode indicates slow/high quality encode, the current sub-block includes the DC component, and the temporal layer the current sub-block is base layer, no pruning may be performed (all candidate matrices are used). However, if one or more of the encode mode indicates fast/low quality encode, the current sub-block does not include the DC component, or the temporal layer the current sub-block is non-base layer, one or more less aggressive matrices may be pruned.

In an embodiment, all else being equal, a faster and/or lower quality encode mode may provide for pruning of more less aggressive matrices. In an embodiment, all else being equal, a greater distance of the sub-block from the DC component may provide for pruning of more less aggressive matrices. Distance of the sub-block from the DC component may be determined using a Euclidian or Manhattan distance from the DC component or a sub-block including the DC component as discussed herein. For example, sub-block 1301 may be a distance of zero from the DC component (as it is included therein), sub-block 1302 may be a distance of two from the DC component (e.g., two over), sub-block 1303 may be a distance of two from the DC component (e.g., two down), and sub-block 1304 may be a distance of four from the DC component (e.g., two over and two down). In an embodiment, all else being equal, a greater temporal layer of the sub-block may provide for pruning of more less aggressive matrices. For example, assuming three candidate matrices, no pruning would test all three candidate matrices, pruning of one least aggressive matrix would test the two remaining more aggressive matrices, and pruning of two less aggressive matrices would test the remaining most matrix (e.g., against no weighting).

Processing continues at operation 1204, where a sub-matrix of the selected candidate matrix corresponding to the current sub-block is applied to the current sub-block. For example, the selected candidate matrix may be divided into sub-matrices in analogy with the division of the current transform coefficient block into sub-blocks. After the division, the corresponding sub-matrix is applied to the current sub-block by entry-wise multiplication of the entries of transform coefficient sub-block and weighting parameters of the sub-matrix. For example, the resultant weighted sub-block is the entry-wise product (i.e., Hadamard product) of the current sub-block and the current sub-matrix.

Figure 14:
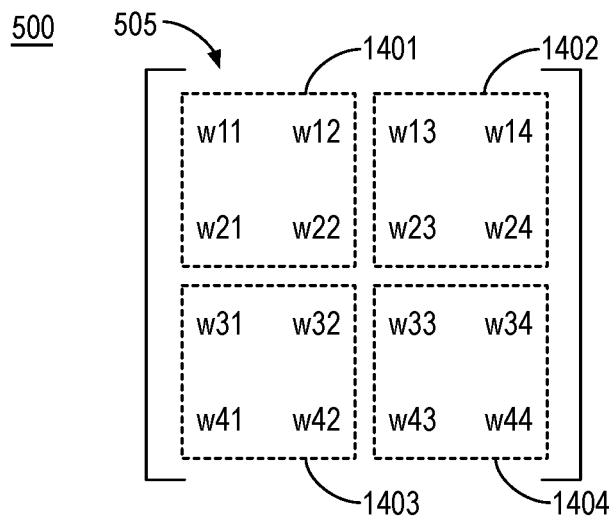
FIG. 14 illustrates an example weighting parameter matrix 500 into example sub-matrices.

FIG. 14 illustrates example weighting parameter matrix 500 divided into example sub-matrices 1401, 1402, 1403, 1404, arranged in accordance with at least some implementations of the present disclosure. In the illustrated example, weighting parameter matrix 500 is a 4×4 matrix of weighting parameters 505 (labeled as w11-w44); however weighting parameter matrix 500 may be any size corresponding to the transform coefficient block to which it is to be applied. As shown in FIG. 14, weighting parameter matrix 500 may be divided into four sub-matrices 1401, 1402, 1403, 1404 such that sub-matrices 1401, 1402, 1403, 1404 are divided in the same manner as the division of transform coefficient block 121 (as shown in FIG. 13). As discussed, weighting parameters 505 of weighting parameter matrix 500 correspond to transform coefficients 401 of transform coefficient block 121 such that weighting parameters 505 are to be applied to the corresponding frequency component coefficients of transform coefficient block 121.

Figure 15:
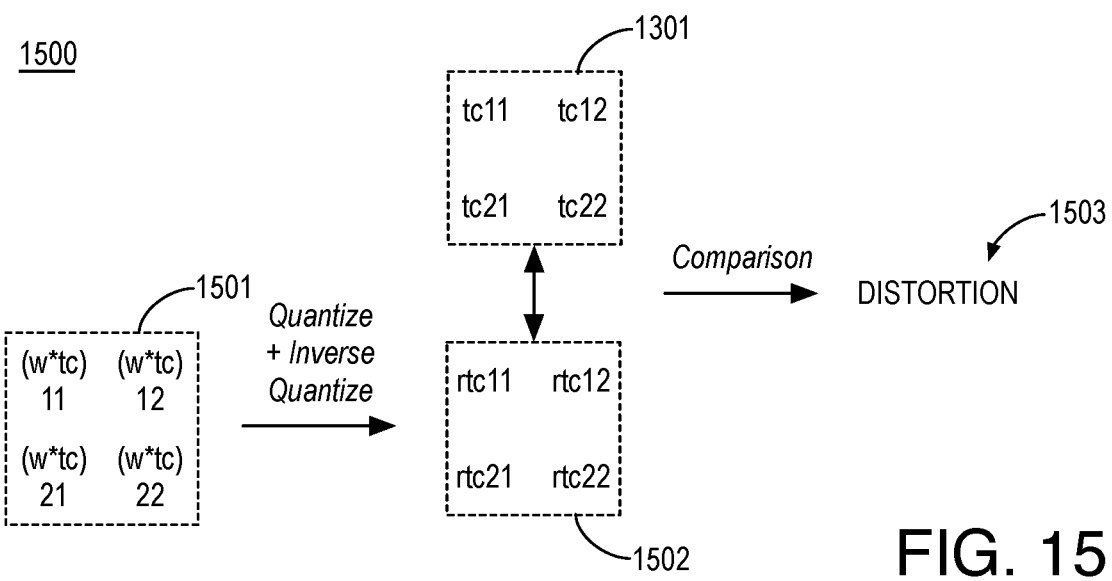
FIG. 15 illustrates an example data structure for applying a sub-matrix of weighting parameters to a corresponding sub-block of transform coefficients and evaluation of the resultant distortion.

FIG. 15 illustrates an example data structure 1500 for applying a sub-matrix of weighting parameters to a corresponding sub-block of transform coefficients and evaluation of the resultant distortion, arranged in accordance with at least some implementations of the present disclosure. As shown in FIG. 15, a weighted transform coefficient sub-block 1501 including weighted transform coefficients (labeled (w*tc)11-(w*tc)22) is generated by entry-wise multiplication of the entries of sub-block 1301 and weighting parameter sub-matrix 1401. For example, weighted transform coefficient sub-block 1501 is the entry-wise product (i.e., Hadamard product) of sub-block 1501 and sub-matrix 1401. For example, weighted transform coefficient sub-block 1501 may be generated by operation 1204.

Returning to FIG. 12, processing continues at operation 1205, where, if needed, the resultant sub-block of weighted transform coefficients may be quantized. For example, the resultant sub-block is quantized when the sub-block of transform coefficients was previously un-quantized.

Furthermore, at operation 1205, an early skip decision may be made for process 1200. In an embodiment, at operation 1203, an order of selection of candidate matrices is provided from least aggressive to most aggressive. Thereby, during a first iteration (for a current sub-block), a least aggressive matrix is being applied. At subsequent iterations (for the current sub-block), increasingly aggressive matrices are to be applied. However, if, after quantization, the weighted quantized transform coefficients for the current sub-block are all zero at operation 1205, then processing of any of the remaining candidate matrices is skipped. For example, if the least aggressive matrix provides for all zero weighted quantized transform coefficients, it is assumed subsequent more aggressive matrices will also yield all zero weighted quantized transform coefficients. Such a skip decision may be made at any candidate matrix such that previous matrices (and the current matrix) are evaluated but subsequent, more aggressive candidate matrices are skipped. It is noted that, if a skip decision is made, the current candidate matrix (which first zeroed out the weighted quantized transform coefficients for the current sub-block) is still evaluated as discussed below.

Processing continues at operation 1206, where the weighted quantized transform coefficients of the sub-block are inverse quantized. The weighted quantized transform coefficients of the sub-block may be inverse quantized using any suitable technique or techniques to generate a reconstructed sub-block of transform coefficients.

Processing continues at operation 1207, where a coding cost for the current sub-block and the current sub-matrix are determined. The coding cost for the current sub-block and the current sub-matrix may be determined using any suitable technique or techniques. In an embodiment, the determination of the coding cost is based on evaluation of the impact of applying the weighting sub-matrix on final distortion (e.g., following quantization, if needed, and inverse quantization as discussed with respect to operations 1205, 1206) and on an estimated rate corresponding to the current sub-block. In an embodiment, the distortion is based on the sum of the squared differences between the sub-block transform coefficients (i.e., the un-quantized transform coefficients) and the reconstructed sub-block of transform coefficients (i.e., the inverse quantized transform coefficients).

Figure 16:
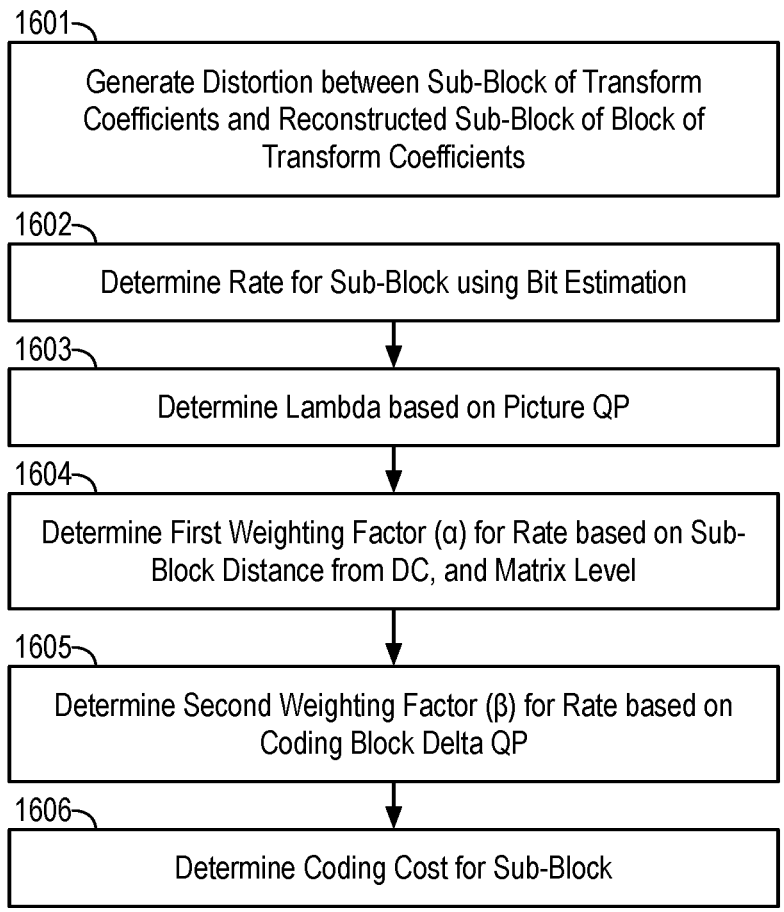
FIG. 16 is a flow diagram illustrating an example process for determining a coding cost.

FIG. 16 is a flow diagram illustrating an example process implemented, for example, at operation 1207 for determining a coding cost, arranged in accordance with at least some implementations of the present disclosure. The process may include one or more operations 1601-1606 as illustrated in FIG. 16 and the process may be performed by a system (e.g., system 100, system 150, etc.) to provide human visual system optimized transform coefficient shaping for video encoding. For example, the process may be performed by weighting parameter selection module 105.

Processing may begin at operation 1601, where a distortion between the reconstructed sub-block of transform coefficients as generated at operation 1206 and the sub-block transform coefficients (i.e., the un-quantized transform coefficients) is generated. With reference to FIG. 15, at operation 1205, weighted transform coefficient sub-block 1501 is quantized, if needed. As discussed, if weighted transform coefficient sub-block 1501 includes un-quantized transform coefficients, quantization is performed and, if not, no quantization is performed. At operation 1206, the quantized weighted transform coefficient sub-block is inverse quantized to generate reconstructed transform coefficient sub-block 1502. As shown, reconstructed transform coefficient sub-block 1502 includes reconstructed transform coefficients (labeled as rtc11-rtc22) that correspond to the transform coefficients of sub-block 1301. As shown, the reconstructed transform coefficients of reconstructed transform coefficient sub-block 1502 are compared, at operation 1601, with the transform coefficients of transform coefficient sub-block 1301 (please note, if weights were applied to quantized transform coefficients, the un-quantized transform coefficients are retrieved for comparison) to determine distortion 1503. Distortion 1503 may be determined using any suitable technique or techniques such as a sum of squared differences or a sum of absolute differences.

As will be discussed with respect to operation 1606, distortion 1503, an estimated rate for transform coefficient sub-block 1301 (e.g., determined using bit estimation functions), and one or more optional rate weighting factors are used to generate the coding cost for the current sub-block and sub-matrix. In an embodiment, the coding cost for the current sub-block and sub-matrix is generated using Equation (1) as follows:

$$\text{Cost} = D + \alpha * \beta * \lambda * R \quad (1)$$

where Cost is the coding cost, D is the distortion (e.g., distortion 1503), R is the rate for the sub-block, $\lambda$ is determined using picture quantization parameter (QP), $\alpha$ is a first rate weighting factor generated as discussed further below, and $\beta$ is a second rate weighting factor generated as discussed further below. In some embodiments, $\alpha$ and $\beta$ are not used (e.g., set to one in Equation (1)).

With continued reference to FIG. 16, processing continues at operation 1602, where the rate is determined for the current transform coefficient sub-block. The rate may be determined using any suitable technique or techniques. In an embodiment, the rate is determined using bit estimation functions. Processing continues at operation 1603, where a lambda value is determined for the current transform coefficient sub-block. The lambda value may be determined using any suitable technique or techniques such as generation of lambda using picture quantization parameter (QP) as is known in the art. For example, the same lambda value may be used for all transform coefficient sub-blocks of a particular picture of video.

Processing continues at operation 1604, where a first rate weighting factor, a, may be determined for the current transform coefficient sub-block. The first rate weighting factor may be generated based on human visual system concepts such as distance from DC of the current transform coefficient sub-block and the matrix level determined for the current transform coefficient sub-block (as discussed with respect to operation 903). An example of the selection of the parameter a as a function of matrix aggressiveness level and region in the transform coefficient matrix is given in Table 3.

TABLE 3

| Level | Region in Transform Coefficient Matrix | | |
|---|---|---|---|
| | 1 | 2 | 3 |
| 0 | 1 | 1 | 1 |
| 1 | 1 | 1 | 1 |
| 2 | 2 | 3 | 10 |
| 3 | 3 | 5 | 10 |

TABLE 3-continued

| Level | Region in Transform Coefficient Matrix | | |
|---|---|---|---|
| | 1 | 2 | 3 |
| 4 | 5 | 5 | 10 |
| 5 | 5 | 5 | 10 |
| 6 | 5 | 5 | 10 |
| 7 | 5 | 5 | 10 |

As shown with respect to Equation (1), increasing values of the first rate weighting factor cause rate to be penalized more heavily with respect to distortion. In an embodiment, a more aggressive matrix level may correspond to monotonically increasing values of the first rate weighting factor. Furthermore, a greater distance from the DC component of the current transform coefficient sub-block may correspond to monotonically increasing values of the first rate weighting factor. In Table 3, region 1 may include the DC component, region 2 may be a first distance from the DC component (e.g., a Euclidian or Manhattan distance from the DC component to a center of the transform coefficient sub-block within the transform coefficient block), and region 3 may be a second distance (greater than the first distance) from the DC component. For example, with reference to FIG. 13, sub-block 1301 includes the DC component (tc11) and is therefore region 1 in Table 3. Regions 1302, 1303 are the same distance from the DC component or a center of the sub-block 1301 (e.g., sub-block 1302 is one over and sub-block 1303 is one down from sub-block 1301) and sub-block 1302, 1303 are region 2 in Table 3. Region 1304 is a greater distance from the DC component or a center of the sub-block 1301 (e.g., sub-block 1304 is 1 over and one down—two steps—from sub-block 1301) and sub-block 1304 is represented as region 3 in table 3.

As discussed, a more aggressive matrix level may correspond to monotonically increasing values of the first rate weighting factor. Therefore, the first rate weighting factor may respond in a similar manner to picture resolution, encode mode, video encode mode, temporal layer, logo detectors, and strong moving edge detectors as does the selection of matrix aggressiveness level discussed herein. In an embodiment, all else being equal, a greater resolution of the picture may provide for selection of a higher first rate weighting factor. In an embodiment, all else being equal, an encode mode of a coding block including the transform sub-block indicating an intra coding mode that is neither DC nor planar mode may provide for selection of a lower first rate weighting factor. In an embodiment, all else being equal, a slower and/or higher quality encode mode may provide for selection of a lower first rate weighting factor. In an embodiment, all else being equal, a lower temporal layer of a picture or a slice that includes the transform sub-block may provide for selection of a lower first rate weighting factor. In an embodiment, all else being equal, an indicator the transform sub-block is in a logo region may provide for selection of a lower first rate weighting factor. In an embodiment, all else being equal, an indicator the transform sub-block is in a region having strong moving edges may provide for selection of a lower first rate weighting factor. In an embodiment, all else being equal, a greater distance of the current transform sub-block from a transform sub-block including the DC component may provide for selection of a greater first rate weighting factor. As will be appreciated, the opposite of each of the above classifiers will result in an opposite response in the first rate weighting factor value.

Processing continues at operation 1605, where a second rate weighting factor, β, may be determined for the current transform coefficient sub-block. The second rate weighting factor may be generated based on delta QP of the coding block including the current transform coefficient sub-block (e.g., at the coding block or coding unit level). The delta QP value may be generated using any suitable technique or techniques. In an embodiment, the second rate weighting factor is an increasing function of the absolute value of delta QP such that the rate of increase is greater when the delta QP value is negative than when delta QP is positive and such that when delta QP is zero the rate weighting factor is one.

Figure 17:
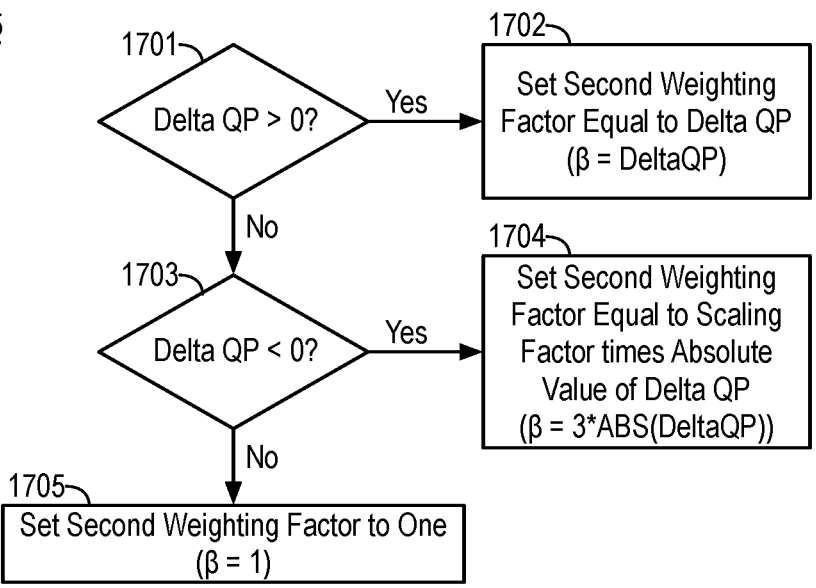
FIG. 17 is a flow diagram illustrating an example process for determining a rate weighting factor based on delta QP.

FIG. 17 is a flow diagram illustrating an example process implemented, for example, at operation 1605 for determining a rate weighting factor based on delta QP, arranged in accordance with at least some implementations of the present disclosure. The process may include one or more operations 1701-1705 as illustrated in FIG. 17 and the process may be performed by a system (e.g., system 100, system 150, etc.) to provide human visual system optimized transform coefficient shaping for video encoding. For example, the process may be performed by weighting parameter selection module 105 using delta QP data 118.

Processing may begin at decision operation 1701, where a determination may be made as to whether a delta QP for a coding block including the current transform coefficient sub-block is greater than zero. If so, processing continues at operation 1702, where the second rate weighting factor, β, may be set to a value equal to delta QP (e.g., β=DeltaQP). If not, processing continues at decision operation 1703, where a determination may be made as to whether a delta QP for a coding block including the current transform coefficient sub-block is less than zero. If so, processing continues at operation 1704, where the second rate weighting factor, β, may be set to a value equal to a scaling factor (greater than one) times an absolute value of delta QP (e.g., β=3*ABS (DeltaQP), where the scaling factor is 3). If not, processing continues at operation 1705, where, when delta QP is zero, the second rate weighting factor, β, is set to one (e.g., β=1). Although illustrated with respect to the second rate weighting factor being set to delta QP for positive delta QP and the second rate weighting factor being set to a scaling factor (greater than one) times an absolute value of delta QP for negative delta QP, scaling factors for positive delta QP (e.g., 1 in the above example) and negative QP (e.g., 3 in the above example) may be any values such that the second rate weighting factor is an increasing function of the absolute value of delta QP such that the rate of increase is greater when the delta QP value is negative than when delta QP is positive (e.g., scaling factor for positive delta QP<scaling factor for negative delta QP).

Returning to FIG. 16, processing continues at operation 1606, where, as discussed, the distortion from operation 1601, the rate from operation 1602, the lambda from operation 1603, the first weighting factor for rate from operation 1604, and the second weighting factor for rate from operation 1605, an estimated rate for transform coefficient sub-block (e.g., determined using bit estimation functions), and one or more optional rate weighting factors are used to generate the coding cost for the current sub-block and sub-matrix. In an embodiment, the coding cost for the current sub-block and sub-matrix is generated using Equation (1) as discussed above such that the coding cost is a sum of the distortion and a product of the rate, the lambda, the first weighting factor, and the second weighting factor.

Returning now to FIG. 12, processing continues at decision operation 1208, where a determination is made as to whether the current candidate sub-matrix is the last candidate sub-matrix. If not, processing continues at operations 1203-1207 for each available candidate sub-matrix (e.g., one for each candidate matrix). If so, processing continues at operation 1209, where a candidate sub-matrix is selected corresponding to a lowest cost. Processing continues at decision operation 1210, where a determination is made as to whether the current transform coefficient sub-block is the last transform coefficient sub-block of the current transform coefficient block. If not, processing continues at operations 1202-1209 for each transform coefficient sub-block until each sub-block has been processed.

If so, processing continues at operation 1211, where each of the selected sub-matrices are combined into a set of weighting parameters for application to the current transform coefficient block. For example, the discussed processing may combine the best sub-matrix for each region (e.g., sub-block) of the current transform coefficient block into a matrix for application to the current transform coefficient block. As will be appreciated, the resultant matrix may merge various regions of the candidate matrices to generate a new matrix customized to the current transform coefficient block. Such processing may provide for better optimized rate savings through weighting of the transform coefficient block with few or no visual artifacts.

As discussed, sub-blocks of a block of transform coefficients may each be evaluated for a number of matrices (e.g., using sub-matrices thereof) to select best sub-matrices, which are piece-wise combined to generate a resultant matrix for application to the block of transform coefficients for improved bit rate. Such refinement processing may be costly in terms of speed and computation cost since it involves evaluating the impact of weighting using a number of candidate matrices, which involves performing weighting, quantization (if needed), and inverse quantization for each sub-block and candidate sub-matrix. Discussion now turns to optional processing that may improve implementation efficiency for such sub-block analysis.

Figure 18:
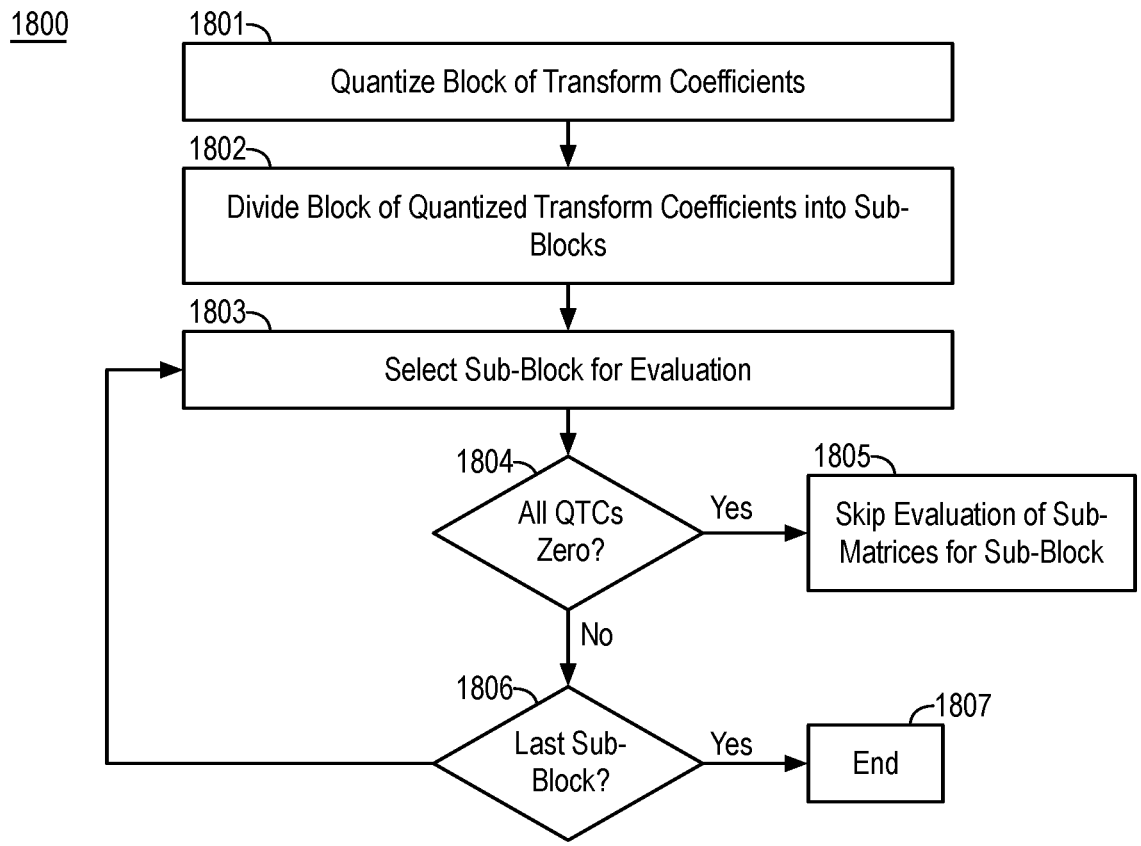
FIG. 18 is a flow diagram illustrating an example process for determining whether to skip sub-matrix evaluation for a transform coefficient sub-block.

FIG. 18 is a flow diagram illustrating an example process 1800 for determining whether to skip sub-matrix evaluation for a transform coefficient sub-block, arranged in accordance with at least some implementations of the present disclosure. Process 1800 may include one or more operations 1801-1807 as illustrated in FIG. 18. Process 1800 may be performed by a system (e.g., system 100, system 105, etc.) to provide human visual system optimized transform coefficient shaping for video encoding. For example, the process may be performed by weighting parameter selection module 105.

Process 1800 begins at operation 1801, where a block of transform coefficients (e.g., un-quantized transform coefficients) are quantized. The block of transform coefficients may be quantized using any suitable technique or techniques. Processing continues at operation 1802, where the block of quantized transform coefficients is divided into sub-blocks as discussed herein with respect to operation 1201. For example, with reference to FIG. 13, transform coefficient block 121 may be divided into sub-blocks 1301, 1302, 1303, 1304. Processing continues at operation 1803, where a sub-block is selected for evaluation. With reference to FIG. 13, sub-block 1301 may be selected for evaluation, followed by sub-blocks 1302, 1303, 1304 in turn. Processing continues at decision operation 1804, where a determination is made whether all of the quantized transform coefficients for the current sub-block are zero. If so, processing continues at operation 1805, where evaluation of sub-matrices for the sub-block are skipped. If not processing continues at decision operation 1806, where a determination is made as to whether the current transform coefficient sub-block is the last transform coefficient sub-block of the current transform coefficient block. If not, processing continues at operations 1803-1805 for each transform coefficient sub-block until each sub-block has been processed. If so, processing ends at operation 1807.

As discussed, each sub-block of quantized transform coefficients may be analyzed to determine if all quantized transform coefficients are zero and, if so, evaluation of sub-matrices for the sub-block are skipped. For example, a skip processing flag or the like may be provided for the sub-block. For example, process 1800 may be merged with process 1200 such that, at operation 1202, any blocks for which all quantized transform coefficients are zero (after quantization at the transform block level and prior to weighting) are skipped and, correspondingly, processing according to operations 1202-1207 is skipped.

For example, applying quantization at the transform block (e.g., TU) level may result in a number of zero quantized transform coefficients. By first going through quantization processing for the whole transform block (e.g., TU) to determine any sub-block having all of their quantized coefficients set to zero through quantization may provide efficiency through skipping sub-block and sub-matrix evaluation as there would be no need to apply the weighting to the sub-blocks that yield all zero quantized coefficient sub-blocks. For example, the refinement of sub-block as discussed with respect to process 1200 thereby only evaluates sub-blocks that yield one or more non-zero quantized coefficients.

In addition or in the alternative, for improved efficiency, the discussed application of weighting parameters (e.g., matrices of weighting parameters) to blocks of transform coefficients may be only applied to a luma channel of the block of transform coefficients. For example, further reduction in complexity may be achieved by restricting the application of weighting parameters to luma transform coefficients only as opposed to application to both luma and chroma transform coefficients.

Figure 19:
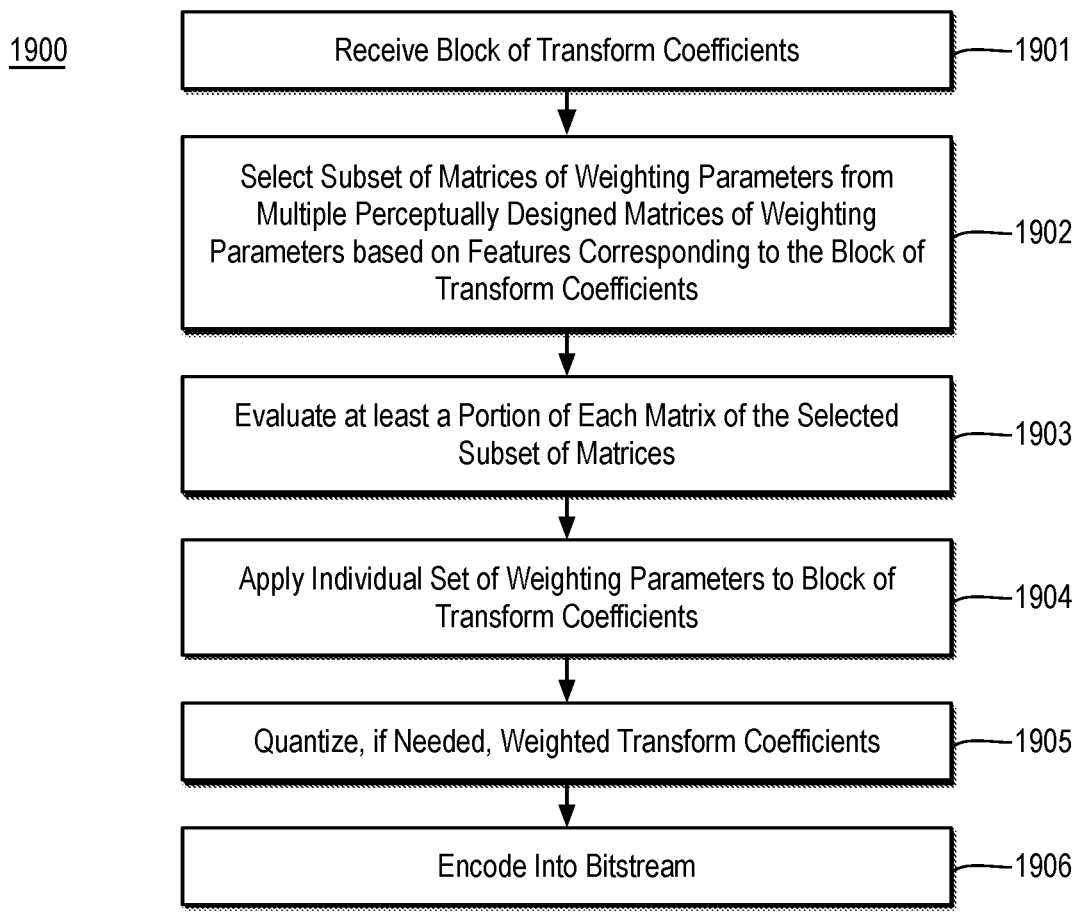
FIG. 19 is a flow diagram illustrating an example process for video encoding.

FIG. 19 is a flow diagram illustrating an example process 1900 for video encoding, arranged in accordance with at least some implementations of the present disclosure. Process 1900 may include one or more operations 1901-1906 as illustrated in FIG. 19. Process 1900 may form at least part of a video coding process. By way of non-limiting example, process 1900 may form at least part of a video coding process as performed by any device or system as discussed herein such as system 100 or system 150. Furthermore, process 1900 will be described herein with reference to system 2000 of FIG. 20.

Figure 20:
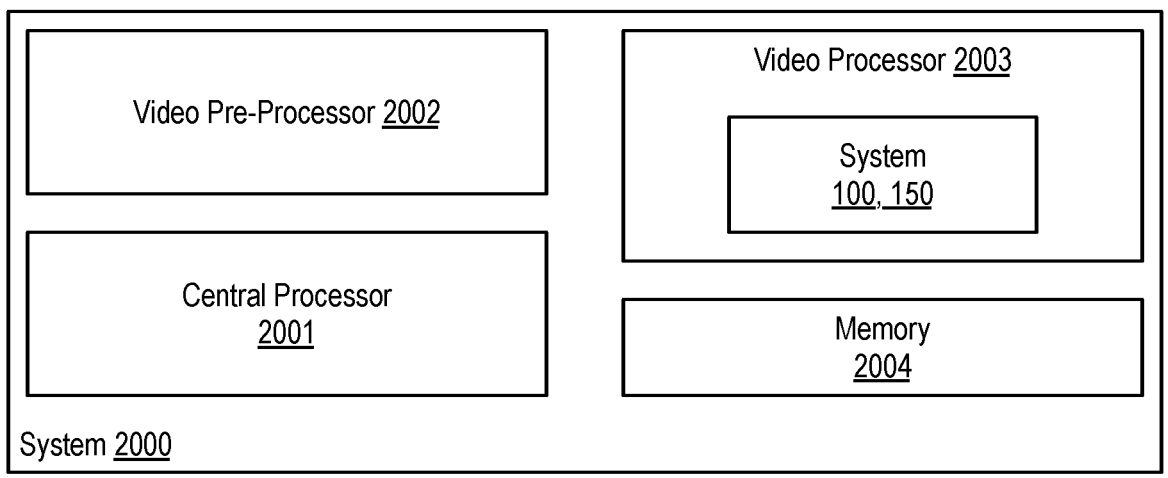
FIG. 20 is an illustrative diagram of an example system for video encoding.

FIG. 20 is an illustrative diagram of an example system 2000 for video encoding, arranged in accordance with at least some implementations of the present disclosure. As shown in FIG. 20, system 2000 may include a central processor 2001, a video pre-processor 2002, a video processor 2003, and a memory 2004. Also as shown, video processor 2003 may include or implement system 100 and/or system 150. In the example of system 2000, memory 2004 may store video data or related content such as input video data, picture data, transform coefficient data, weighting parameters, classifier data, encoded video data, and/or any other data as discussed herein.

As shown, in some embodiments, system 100 and/or system 150 are implemented via video processor 2003. In other embodiments, system 100 and/or system 150 or portions thereof are implemented via video pre-processor 2002 or another processing unit such as an image processor, a graphics processor, or the like. In other embodiments, system 100 and/or system 150 or portions thereof are implemented via central processor 2001 or another processing unit such as an image processor, a graphics processor, or the like.

Video pre-processor 2002 may include any number and type of video, image, or graphics processing units that may provide operations as discussed herein. Such operations may be implemented via software or hardware or a combination thereof. For example, video pre-processor 2002 may include circuitry dedicated to manipulate pictures, picture data, or the like obtained from memory 2004. Similarly, video processor 2003 may include any number and type of video, image, or graphics processing units that may provide operations as discussed herein. Such operations may be implemented via software or hardware or a combination thereof. For example, video processor 2003 may include circuitry dedicated to manipulate pictures, picture data, or the like obtained from memory 2004. Central processor 2001 may include any number and type of processing units or modules that may provide control and other high level functions for system 2000 and/or provide any operations as discussed herein. Memory 2004 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2004 may be implemented by cache memory.

In an embodiment, one or more or portions of system 100 and/or system 150 are implemented via an execution unit (EU). The EU may include, for example, programmable logic or circuitry such as a logic core or cores that may provide a wide array of programmable logic functions. In an embodiment, one or more or portions of system 100 and/or system 150 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 19, process 1900 may begin at operation 1901, where a block of transform coefficients corresponding to a transform block of a picture of input video may be received for processing. In some embodiments, the block of transform coefficients are quantized transform coefficients. In some embodiments, the block of transform coefficients are un-quantized transform coefficients and, at operation 1905, corresponding weighted transform coefficients are quantized before encode.

Processing continues at operation 1902, where a subset of matrices of weighting parameters are selected for the block of transform coefficients from multiple perceptually-designed matrices of weighting parameters based on one or more classifiers corresponding to the block of transform coefficients. The subset of matrices may be selected using any suitable technique or techniques. In some embodiments, the one or more classifiers include at least one of a block size of the transform block, a resolution of the picture, an encode mode of the input video, a temporal layer of the picture or a slice that includes the transform block, an indicator the transform block is in a logo region, or an indicator the transform block is in a region having strong moving edges. In an embodiment, the one or more classifiers indicate whether the transform block is visually important and selecting the subset of matrices includes selecting less aggressive matrices of weighting parameters when the transform block is visually important and selecting more aggressive matrices of weighting parameters when the transform block is not visually important. In an embodiment, the one or more classifiers to indicate whether the transform block is visually important include at least one of an activity level of a coding block that includes the transform block or a frame rate of the input video.

Processing continues at operation 1903, where at least a portion of each matrix of the subset of matrices selected at operation 1902 are evaluated to determine a set of weighting parameters for application to the block of transform coefficients. The portion of each matrix of the subset of matrices may be evaluated using any suitable technique or techniques. In an embodiment, the evaluation includes dividing the block of transform coefficients into a plurality of sub-blocks, applying a sub-matrix of each matrix of the subset of matrices to a first sub-block of the plurality of sub-blocks to generate candidate weighted sub-blocks of transform coefficients, inverse quantizing the candidate weighted sub-blocks of transform coefficients or quantized coefficients corresponding to the candidate weighted sub-blocks of transform coefficients (e.g., which may be generated by a quantization operation) to generate reconstructed sub-blocks of transform coefficients, generating a coding cost for each sub-matrix by comparing each of the reconstructed sub-blocks of transform coefficients with the first sub-block of transform coefficients, selecting a sub-matrix having a lowest coding cost, and populating the individual set of weighting parameters with the sub-matrix having a lowest coding cost.

In some embodiments, generating the coding cost for each sub-matrix includes determining a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges. In some embodiments, generating the coding cost for each sub-matrix includes determining a rate weighting factor based at least on a delta QP value corresponding to a coding block including the transform block. For example, the rate weighting factor may be an increasing function of the absolute value of delta QP such that the rate of increase is greater when the delta QP value is negative than when delta QP is positive, and such that when delta QP is zero the rate weighting factor is one. In some embodiments, both discussed rate weighting factor may be used. In some embodiments, process 1900 further includes quantizing the block of transform coefficients to generate a block of quantized transform coefficients, determining whether any sub-block of the block of quantized transform coefficients corresponding to the plurality of sub-blocks consists of only zero values, and in response to a second sub-block having only zero values in the quantized transform coefficients, bypassing application of sub-matrices to the second sub-block.

Processing continues at operation 1904, where the set of weighting parameters as optionally selected and refined as discussed with respect to operations 1903 are applied to the block of transform coefficients to generate weighted transform coefficients. For example, the set of weighting parameters may be a perceptually-designed matrix of weighting parameters optionally selected from a set of perceptually-designed matrices of weighting parameters and/or refined by evaluation of portions of a selected set of perceptually-designed matrices. The set of weighting parameters may be applied to the block of transform coefficients using any suitable technique or techniques. As discussed, the block of transform coefficients may be un-quantized or quantized. In an embodiment, applying the weighting parameters to the block of transform coefficients may include an entry-wise matrix multiplication and a subsequent rounding operation. In an embodiment, applying the individual set of weighting parameters to the block of transform coefficients includes only applying the individual set of weighting parameters to a luma channel of the block of transform coefficients.

Processing continues at operation 1905, where the weighted transform coefficients are quantized, if needed. As discussed, in some embodiments, the block of transform coefficients received at operation 1901 are quantized transform coefficients. In such embodiments, the weighted transform coefficients do not need to be quantized. In other embodiments, the block of transform coefficients are un-quantized transform coefficients. In such embodiments, the weighted transform coefficients are quantized at operation 1905. The weighted transform coefficients may be quantized using any suitable technique or techniques.

Processing continues at operation 1906, where the weighted transform coefficients are encoded into a bit-stream. For example, the quantized weighted transform coefficients may be encoded into any suitable bitstream such as a standards compliant bitstream.

Process 1900 may be repeated any number of times either in series or in parallel for any number input blocks of transform coefficients. As discussed, process 1900 may provide for improved bit rate and improved video quality through human visual system optimized transform coefficient shaping.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 21:
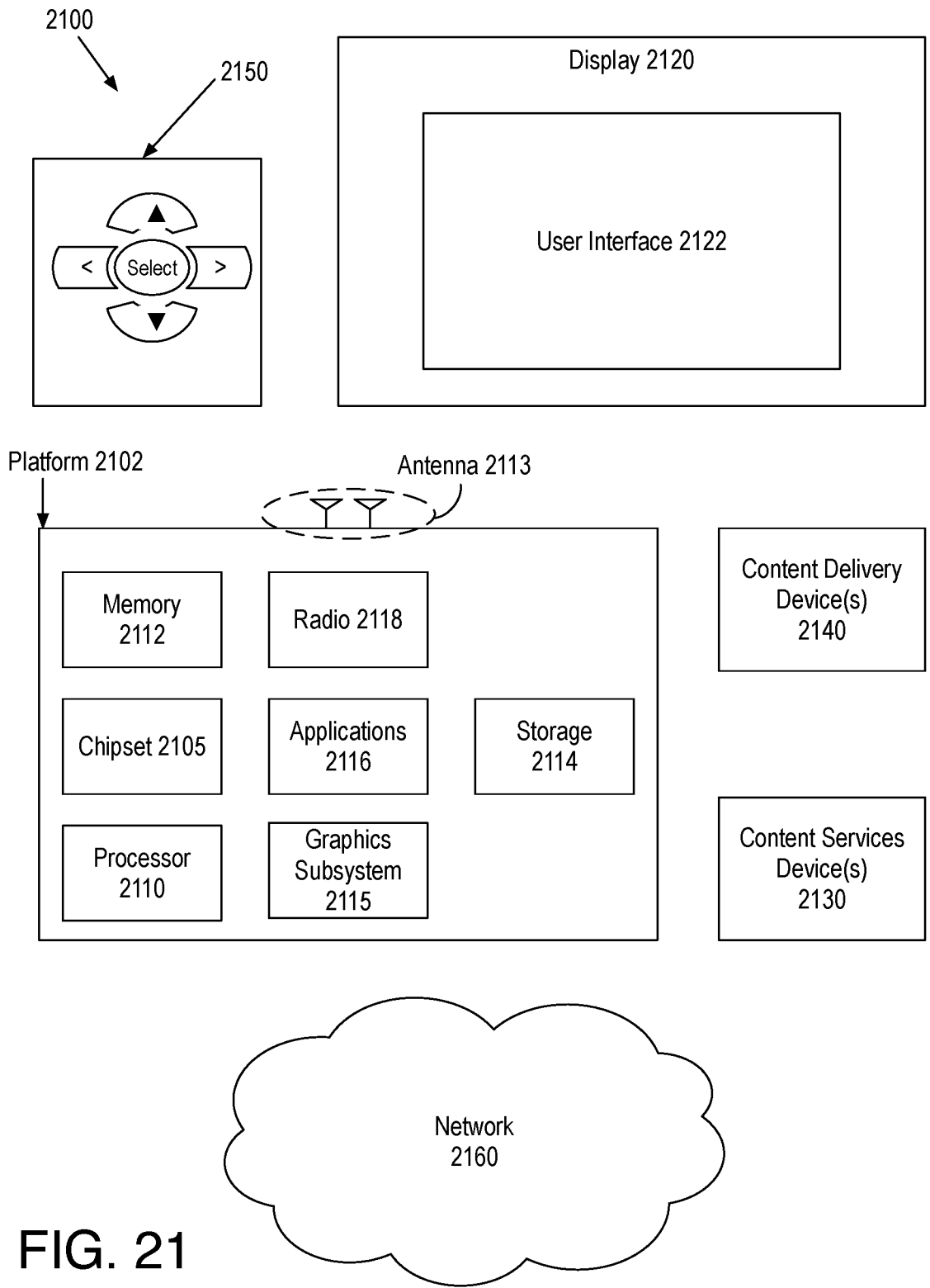
FIG. 21 is an illustrative diagram of an example system.

FIG. 21 is an illustrative diagram of an example system 2100, arranged in accordance with at least some implementations of the present disclosure. In various implementations, system 2100 may be a mobile system although system 2100 is not limited to this context. For example, system 2100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2100 includes a platform 2102 coupled to a display 2120. Platform 2102 may receive content from a content device such as content services device(s) 2130 or content delivery device(s) 2140 or other similar content sources. A navigation controller 2150 including one or more navigation features may be used to interact with, for example, platform 2102 and/or display 2120. Each of these components is described in greater detail below.

In various implementations, platform 2102 may include any combination of a chipset 2105, processor 2110, memory 2112, antenna 2113, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, DisplayPort, wireless HDMI, and/or wireless HD compliant techniques. Graphics subsystem 2115 may be integrated into processor 2110 or chipset 2105. In some implementations, graphics subsystem 2115 may be a stand-alone device communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of uni-directionally or bi-directionally communicating content between content providers and platform 2102 and/or display 2120, via network 2160 or directly. It will be appreciated that the content may be communicated uni-directionally and/or bi-directionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of may be used to interact with user interface 2122, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 2120) by movements of a pointer, cursor, focus ring, or other visual indicators displayed on the display. For example, under the control of software applications 2116, the navigation features located on navigation may be mapped to virtual navigation features displayed on user interface 2122, for example. In various embodiments, may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off." In addition, chipset 2105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various embodiments, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various embodiments, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 21.

Figure 22:
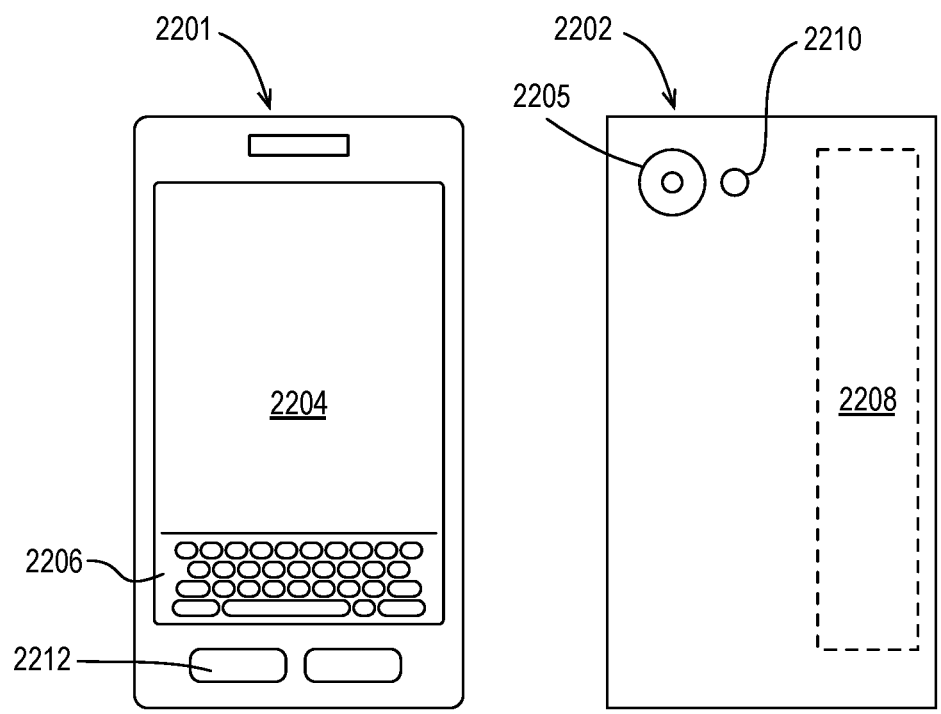
FIG. 22 illustrates an example device, all arranged in accordance with at least some implementations of the present disclosure.

As described above, system 2100 may be embodied in varying physical styles or form factors. FIG. 22 illustrates an example small form factor device 2200, arranged in accordance with at least some implementations of the present disclosure. In some examples, system 2100 may be implemented via device 2200. In other examples, system 100 or portions thereof may be implemented via device 2200. In various embodiments, for example, device 2200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 22, device 2200 may include a housing with a front 2201 and a back 2202. Device 2200 includes a display 2204, an input/output (I/O) device 2206, and an integrated antenna 2208. Device 2200 also may include navigation features 2212. I/O device 2206 may include any suitable I/O device for entering information into a mobile computing device. Examples for I/O device 2206 may include an alphanumeric keyboard, a numeric keypad, a touch pad, input keys, buttons, switches, microphones, speakers, voice recognition device and software, and so forth. Information also may be entered into device 2200 by way of microphone (not shown), or may be digitized by a voice recognition device. As shown, device 2200 may include a camera 2205 (e.g., including a lens, an aperture, and an imaging sensor) and a flash 2210 integrated into back 2202 (or elsewhere) of device 2200. In other examples, camera 2205 and flash 2210 may be integrated into front 2201 of device 2200 or both front and back cameras may be provided. Camera 2205 and flash 2210 may be components of a camera module to originate image data processed into streaming video that is output to display 2204 and/or communicated remotely from device 2200 via antenna 2208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video encoding comprises receiving a block of transform coefficients corresponding to a transform block of a picture of input video, applying a set of weighting parameters to the block of transform coefficients to generate weighted transform coefficients, and encoding the weighted transform coefficients into a bitstream.

In one or more second embodiments, for any of the first embodiments, the block of transform coefficients comprises a block of quantized transform coefficients.

In one or more third embodiments, for any of the first or second embodiments, the method further comprises quantizing, after said applying the set of weighting parameters, the weighted transform coefficients, such that said encoding comprises encoding quantized weighted transform coefficients.

In one or more fourth embodiments, for any of the first through third embodiments, the method further comprises selecting a subset of matrices of weighting parameters for the block of transform coefficients from a plurality of perceptually-designed matrices of weighting parameters based on one or more classifiers corresponding to the block of transform coefficients and evaluating at least a portion of each matrix of the subset of matrices to determine the set of weighting parameters for the block of transform coefficients.

In one or more fifth embodiments, for any of the first through fourth embodiments, one or more classifiers comprises at least one of a block size of the transform block, a resolution of the picture, an encode mode of the input video, a temporal layer of the picture or a slice that includes the transform block, an indicator the transform block is in a logo region, or an indicator the transform block is in a region having strong moving edges.

In one or more sixth embodiments, for any of the first through fifth embodiments, the one or more classifiers indicate whether the transform block is visually important and selecting the subset of matrices comprises selecting less aggressive matrices of weighting parameters when the transform block is visually important and selecting more aggressive matrices of weighting parameters when the transform block is not visually important.

In one or more seventh embodiments, for any of the first through sixth embodiments, the one or more classifiers to indicate whether the transform block is visually important comprises at least one of an activity level of a coding block that includes the transform block or a frame rate of the input video.

In one or more eighth embodiments, for any of the first through seventh embodiments, said evaluating comprises dividing the block of transform coefficients into a plurality of sub-blocks, applying a sub-matrix of each matrix of the subset of matrices to a first sub-block of the plurality of sub-blocks to generate candidate weighted sub-blocks of transform coefficients, inverse quantizing the candidate weighted sub-blocks of transform coefficients or quantized coefficients corresponding to the candidate weighted sub-blocks of transform coefficients to generate reconstructed sub-blocks of transform coefficients, generating a coding cost for each sub-matrix by comparing each of the reconstructed sub-blocks of transform coefficients with the first sub-block of transform coefficients, selecting a sub-matrix having a lowest coding cost, and populating the individual set of weighting parameters with the sub-matrix having a lowest coding cost.

In one or more ninth embodiments, for any of the first through eighth embodiments, said generating the coding cost for each sub-matrix comprises determining a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges.

In one or more tenth embodiments, for any of the first through ninth embodiments, said generating the coding cost for each sub-matrix comprises determining a rate weighting factor based at least on a delta QP value corresponding to a coding block including the transform block.

In one or more eleventh embodiments, for any of the first through tenth embodiments, the rate weighting factor is an increasing function of the absolute value of delta QP such that the rate of increase is greater when the delta QP value is negative than when delta QP is positive, and such that when delta QP is zero the rate weighting factor is one.

In one or more twelfth embodiments, for any of the first through eleventh embodiments, the method further comprises quantizing the block of transform coefficients to generate a block of quantized transform coefficients, determining whether any sub-block of the block of quantized transform coefficients corresponding to the plurality of sub-blocks consists of only zero values, and in response to a second sub-block having only zero values in the quantized transform coefficients, bypassing application of sub-matrices to the second sub-block.

In one or more thirteenth embodiments, for any of the first through twelfth embodiments, said applying the individual set of weighting parameters to the block of transform coefficients comprises only applying the individual set of weighting parameters to a luma channel of the block of transform coefficients.

In one or more fourteenth embodiments, a system for video encoding comprises a memory to store a block of transform coefficients corresponding to a transform block of a picture of input video and one or more processors coupled to the memory, the one or more processors to apply a set of weighting parameters to the block of transform coefficients to generate weighted transform coefficients and encode the weighted transform coefficients into a bitstream.

In one or more fifteenth embodiments, for any of the fourteenth embodiments, the one or more processors are further to select a subset of matrices of weighting parameters for the block of transform coefficients from a plurality of perceptually-designed matrices of weighting parameters based on one or more classifiers corresponding to the block of transform coefficients and evaluate at least a portion of each matrix of the subset of matrices to determine the set of weighting parameters for the block of transform coefficients.

In one or more sixteenth embodiments, for any of the fourteenth or fifteenth embodiments, the one or more classifiers indicate whether the transform block is visually important and the one or more processors to select the subset of matrices comprises the one or more processors to select less aggressive matrices of weighting parameters when the transform block is visually important and more aggressive matrices of weighting parameters when the transform block is not visually important.

In one or more seventeenth embodiments, for any of the fourteenth through sixteenth embodiments, the one or more processors to evaluate comprises the one or more processors to divide the block of transform coefficients into a plurality of sub-blocks, apply a sub-matrix of each matrix of the subset of matrices to a first sub-block of the plurality of sub-blocks to generate candidate weighted sub-blocks of transform coefficients, inverse quantize the candidate weighted sub-blocks of transform coefficients or quantized coefficients corresponding to the candidate weighted sub-blocks of transform coefficients to generate reconstructed sub-blocks of transform coefficients, generate a coding cost for each sub-matrix by a comparison of each of the reconstructed sub-blocks of transform coefficients with the first sub-block of transform coefficients, select a sub-matrix having a lowest coding cost, and populate the individual set of weighting parameters with the sub-matrix having a lowest coding cost.

In one or more eighteenth embodiments, for any of the fourteenth through seventeenth embodiments, the one or more processors to generate the coding cost for each sub-matrix comprises the one or more processors to determine a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges.

In one or more nineteenth embodiments, for any of the fourteenth through eighteenth embodiments, the one or more processors to generate the coding cost for each sub-matrix comprises the one or more processors to determine a rate weighting factor based at least on a delta QP value corresponding to a coding block including the transform block.

In one or more twentieth embodiments, at least one machine readable medium may include a plurality of instructions that in response to being executed on a computing device, causes the computing device to perform a method according to any one of the above embodiments.

In one or more twenty-first embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video encoding comprising:
  receiving a block of transform coefficients comprising a matrix of transform coefficients and corresponding to a transform block of a picture of input video;
  selecting a subset of matrices of weighting parameters for the block of transform coefficients from a plurality of perceptually-designed matrices of weighting parameters based on one or more classifiers corresponding to the block of transform coefficients;

selecting a set of weighting parameters comprising a matrix of weighting parameters for application to the block of transform coefficients by dividing the block of transform coefficients into a plurality of sub-blocks, applying a sub-matrix of each matrix of the subset of matrices to a first sub-block of the plurality of sub-blocks to generate candidate weighted sub-blocks of transform coefficients, inverse quantizing the candidate weighted sub-blocks of transform coefficients or quantized coefficients corresponding to the candidate weighted sub-blocks of transform coefficients to generate reconstructed sub-blocks of transform coefficients, generating a coding cost for each sub-matrix by comparing each of the reconstructed sub-blocks of transform coefficients with the first sub-block of transform coefficients, selecting a sub-matrix having a lowest coding cost, and populating the matrix of weighting parameters with the sub-matrix having the lowest coding cost;

applying the selected matrix of weighting parameters from the subset of matrices of weighting parameters to the matrix of transform coefficients by entry-wise multiplication of the matrix of weighting parameters and the matrix of transform coefficients to generate weighted transform coefficients; and encoding the weighted transform coefficients into a bitstream to be decoded by a decoder.

2. The method of claim 1, wherein the transform coefficients are quantized transform coefficients.

3. The method of claim 1, further comprising:
quantizing, after said applying the selected matrix of weighting parameters, the weighted transform coefficients, wherein said encoding comprises encoding quantized weighted transform coefficients.

4. The method of claim 1, wherein the one or more classifiers comprises at least one of a block size of the transform block, a resolution of the picture, an encode mode of the input video, a temporal layer of the picture or a slice that includes the transform block, an indicator the transform block is in a logo region, or an indicator the transform block is in a region having strong moving edges.

5. The method of claim 1, wherein the one or more classifiers indicate whether the transform block is visually important and selecting the subset of matrices comprises selecting less aggressive matrices of weighting parameters when the transform block is visually important and selecting more aggressive matrices of weighting parameters when the transform block is not visually important.

6. The method of claim 5, wherein the one or more classifiers to indicate whether the transform block is visually important comprises at least one of an activity level of a coding block that includes the transform block or a frame rate of the input video.

7. The method of claim 1, wherein said generating the coding cost for each sub-matrix comprises determining a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges.

8. The method of claim 1, wherein said generating the coding cost for each sub-matrix comprises determining a rate weighting factor based at least on a delta QP value of a coding block including the transform block.

9. The method of claim 8, wherein the rate weighting factor is an increasing function of the absolute value of delta QP and wherein the rate of increase is greater when the delta QP value is negative than when delta QP is positive, and wherein when delta QP is zero the rate weighting factor is one.

10. The method of claim 1, further comprising:
quantizing the block of transform coefficients to generate a block of quantized transform coefficients;
determining whether any sub-block of the block of quantized transform coefficients corresponding to the plurality of sub-blocks consists of only zero values; and
in response to a second sub-block having only zero values in the quantized transform coefficients, bypassing application of sub-matrices to the second sub-block.

11. The method of claim 1, wherein said applying the individual set of weighting parameters to the block of transform coefficients comprises only applying the individual set of weighting parameters to a luma channel of the block of transform coefficients.

12. A system for video encoding comprising:
a memory to store a block of transform coefficients comprising a matrix of transform coefficients and corresponding to a transform block of a picture of input video; and
processor circuitry coupled to the memory, the processor circuitry to:
select a subset of matrices of weighting parameters for the block of transform coefficients from a plurality of perceptually-designed matrices of weighting parameters based on one or more classifiers corresponding to the block of transform coefficients;
select a set of weighting parameters comprising a matrix of weighting parameters for application to the block of transform coefficients by division of the block of transform coefficients into a plurality of sub-blocks, application of a sub-matrix of each matrix of the subset of matrices to a first sub-block of the plurality of sub-blocks to generate candidate weighted sub-blocks of transform coefficients, inverse quantization of the candidate weighted sub-blocks of transform coefficients or quantized coefficients corresponding to the candidate weighted sub-blocks of transform coefficients to generate reconstructed sub-blocks of transform coefficients, generation of a coding cost for each sub-matrix by comparison of each of the reconstructed sub-blocks of transform coefficients with the first sub-block of transform coefficients, selection of a sub-matrix having a lowest coding cost, and population of the matrix of weighting parameters with the sub-matrix having the lowest coding cost;
apply the selected matrix of weighting parameters from the subset of matrices of weighting parameters to the matrix of transform coefficients by entry-wise multiplication of the matrix of weighting parameters and the matrix of transform coefficients to generate weighted transform coefficients; and
encode the weighted transform coefficients into a bitstream to be decoded by a decoder.

13. The system of claim 12, wherein the one or more classifiers indicate whether the transform block is visually important and the one or more processors to select the subset of matrices comprises the one or more processors to select less aggressive matrices of weighting parameters when the transform block is visually important and more aggressive matrices of weighting parameters when the transform block is not visually important.

14. The system of claim 12, wherein the processor circuitry to generate the coding cost for each sub-matrix comprises the processor circuitry to determine a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges.

15. The system of claim 12, wherein the processor circuitry to generate the coding cost for each sub-matrix comprises the processor circuitry to determine a rate weighting factor based at least on a delta QP value of a coding block including the transform block.

16. At least one non-transitory machine readable medium comprising a plurality of instructions that, in response to being executed on a computing device, cause the computing device to perform video coding by:
receiving a block of transform coefficients comprising a matrix of transform coefficients and corresponding to a transform block of a picture of input video;
selecting a subset of matrices of weighting parameters for the block of transform coefficients from a plurality of perceptually-designed matrices of weighting parameters based on one or more classifiers corresponding to the block of transform coefficients;
selecting a set of weighting parameters comprising a matrix of weighting parameters for application to the block of transform coefficients by dividing the block of transform coefficients into a plurality of sub-blocks, applying a sub-matrix of each matrix of the subset of matrices to a first sub-block of the plurality of sub-blocks to generate candidate weighted sub-blocks of transform coefficients, inverse quantizing the candidate weighted sub-blocks of transform coefficients or quantized coefficients corresponding to the candidate weighted sub-blocks of transform coefficients to generate reconstructed sub-blocks of transform coefficients, generating a coding cost for each sub-matrix by comparing each of the reconstructed sub-blocks of transform coefficients with the first sub-block of transform coefficients, selecting a sub-matrix having a lowest coding cost, and populating the matrix of weighting parameters with the sub-matrix having the lowest coding cost;
applying the selected matrix of weighting parameters from the subset of matrices of weighting parameters to the matrix of transform coefficients by entry-wise multiplication of the matrix of weighting parameters and the matrix of transform coefficients to generate weighted transform coefficients; and
encoding the weighted transform coefficients into a bitstream to be decoded by a decoder.

17. The non-transitory machine readable medium of claim 16, wherein the one or more classifiers indicate whether the transform block is visually important and selecting the subset of matrices comprises selecting less aggressive matrices of weighting parameters when the transform block is visually important and selecting more aggressive matrices of weighting parameters when the transform block is not visually important.

18. The non-transitory machine readable medium of claim 16, wherein said generating the coding cost for each sub-matrix comprises determining a rate weighting factor based at least on a region of the matrix including the sub-matrix and one or more of a block size of the transform block, a resolution of the picture, an encode mode of a coding block that includes the transform block, a temporal layer of the picture or a slice that includes the transform block, an indicator the transform block is in a logo region, or an indicator the transform block is in a region having strong moving edges.

19. The non-transitory machine readable medium of claim 16, wherein said generating the coding cost for each sub-matrix comprises determining a rate weighting factor based at least on a delta QP value of a coding block including the transform block.

20. The non-transitory machine readable medium of claim 19, wherein the rate weighting factor is an increasing function of the absolute value of delta QP and wherein the rate of increase is greater when the delta QP value is negative than when delta QP is positive, and wherein when delta QP is zero the rate weighting factor is one.

21. The system of claim 15, wherein the rate weighting factor is an increasing function of the absolute value of delta QP and wherein the rate of increase is greater when the delta QP value is negative than when delta QP is positive, and wherein when delta QP is zero the rate weighting factor is one.

* * * * *